US012617231B2

(12) United States Patent

Averill et al.

(10) Patent No.: US 12,617,231 B2

(45) Date of Patent: May 5, 2026

(54) ELECTRIC ACTUABLE WHEEL HUBS

(71) Applicant: Warn Automotive, LLC, Milwaukie, OR (US)

(72) Inventors: Bryan M. Averill, Portland, OR (US); Craig Feusse, Fenton, MI (US); Russell Conine, Portland, OR (US); Bryce Gould, Vancouver, WA (US)

(73) Assignee: WARN Automotive, LLC, Milwaukie, OR (US)

( * ) Notice: Subject to any disclaimer, the term of this patent is extended or adjusted under 35 U.S.C. 154(b) by 482 days.

(21) Appl. No.: 18/126,239

(22) Filed: Mar. 24, 2023

(65) Prior Publication Data

US 2023/0302848 A1 Sep. 28, 2023

Related U.S. Application Data

(60) Provisional application No. 63/323,927, filed on Mar. 25, 2022.

(51) Int. Cl.

| | |
|---|---|
| *F16D 48/06* | (2006.01) |
| *B60B 27/00* | (2006.01) |
| *B60B 35/12* | (2006.01) |
| *F16D 11/04* | (2006.01) |
| *F16D 121/24* | (2012.01) |

(52) U.S. Cl.

CPC ........ *B60B 27/0021* (2013.01); *B60B 35/121* (2013.01); *F16D 11/04* (2013.01); *F16D 48/06* (2013.01); *F16D 2121/24* (2013.01); *F16D 2500/1023* (2013.01)

(58) Field of Classification Search

CPC ..... B60B 27/0021; B60B 35/12; F16D 11/04; F16D 48/06; F16D 2023/123; F16D 2500/1023

See application file for complete search history.

(56) References Cited

U.S. PATENT DOCUMENTS

| | | | |
|---|---|---|---|
| 1,338,720 | A | 5/1920 | Darr |
| 6,082,514 | A | 7/2000 | Averill |
| 7,316,304 | B2 | 1/2008 | Heravi et al. |
| 7,793,767 | B2 | 9/2010 | Heravi et al. |
| 9,383,008 | B2 | 7/2016 | Anderson et al. |
| 9,784,321 | B2 | 10/2017 | Pritchard |
| 9,845,834 | B2 | 12/2017 | Kohlbock et al. |
| 9,915,298 | B2 | 3/2018 | Heravi et al. |
| 11,105,406 | B2 | 8/2021 | Boudreau |
| 11,168,743 | B2 * | 11/2021 | Smith .................... F16D 28/00 |
| 2010/0276245 | A1 | 11/2010 | Umeno et al. |
| 2021/0071759 | A1 | 3/2021 | Carmean et al. |

* cited by examiner

*Primary Examiner* — Huan Le

(74) *Attorney, Agent, or Firm* — Fish & Richardson P.C.

(57) ABSTRACT

A forked linkage includes a forked end and a control end. An axially translatable spline coupling is supported and carried by the forked end. A pivot is between the forked end and the control end. A cam is configured to interact with the control end of the forked linkage. The cam includes a profile that defines an axial position of the spline coupling relative to an angular position of the cam. A bias biases the control end towards the cam.

20 Claims, 23 Drawing Sheets

700

702 engaging a wheel hub to a drive axle by a spline coupling at a first rate 704 disengaging the wheel hub from the drive axle by the spline coupling at a second rate

ELECTRIC ACTUABLE WHEEL HUBS

CROSS-REFERENCE TO RELATED APPLICATIONS

This application claims priority under 35 U.S.C. § 119 to U.S. Application No. 63/323,927, filed on Mar. 25, 2022, the contents of which is hereby incorporated by reference.

TECHNICAL FIELD

This disclosure relates to wheel hubs that are actuable to couple and decouple the wheel hubs from a drive axle.

BACKGROUND

Some vehicles employ four-wheel drive systems to increase traction for off-road driving as well as low traction for on-road driving. However, it may be desirable to provide optional engagement/disengagement of the four-wheel drive system to increase the versatility of the vehicle. Specifically, two of the drive wheels may be disengaged to provide two-wheel drive during on-road driving to increase the vehicle's fuel and/or battery economy. On the other hand, four-wheel drive may be used to provide increased traction during certain driving conditions, such as vehicle operation on dirt roads, snow, etc. In this way, a user may adjust a vehicle's drivetrain based on the driving circumstances and the desired vehicle performance characteristics.

Engagement of four-wheel drive systems may be automatically activated or manually activated. Although automatic four-wheel drive engagement has a number of benefits, such as decreased user interaction, automatic four-wheel drive engagement systems also may have some drawbacks, such as greater manufacturing costs as well as repair and maintenance costs. On the other hand, manually engaged four-wheel drive systems have certain benefits over automatically engaged systems, such as increased reliability and decreased manufacturing and repair costs. Therefore, manual four-wheel drive systems may be desired by users who prefer less complex and more reliable four-wheel drive systems, such as off-road enthusiasts.

SUMMARY

This disclosure describes technologies relating to electric actuable wheel hubs.

An example implementation of the subject matter described within this disclosure is an actuable wheel coupling with the following features. A forked linkage includes a forked end and a control end. An axially translatable spline coupling is supported and carried by the forked end. A pivot is between the forked end and the control end. A cam is configured to interact with the control end of the forked linkage. The cam includes a profile that defines an axial position of the spline coupling relative to an angular position of the cam. A bias biases the control end towards the cam.

Aspects of the example wheel coupling, which can be combined with the wheel coupling alone or in other aspects, include the following. The cam is an asymmetric cam.

Aspects of the example wheel coupling, which can be combined with the wheel coupling alone or in other aspects, include the following. The cam is a symmetric cam.

Aspects of the example wheel coupling, which can be combined with the wheel coupling alone or in other aspects, include the following. The profile is configured to axially translate the spline coupling into an engaged position at a first rate and axially translate the spline coupling into a disengaged position at a second rate that is slower than the first rate.

Aspects of the example wheel coupling, which can be combined with the wheel coupling alone or in other aspects, include the following. A roller is attached to the control end of the forked linkage. The roller contacts the cam during normal operation. The roller is coupled to the control end such that the roller translates in unison with the control end.

Aspects of the example wheel coupling, which can be combined with the wheel coupling alone or in other aspects, include the following. The pivot includes a first triangular protrusion extending along a pivot axis of the fork. A point of the first protrusion is in-line with the pivot axis. A first triangular receptacle defines a profile to receive the first triangular protrusion. An angle of the first triangular receptacle is greater than an angle of the point of the first protrusion. The angle of the first triangular receptacle terminates along the pivot axis.

Aspects of the example wheel coupling, which can be combined with the wheel coupling alone or in other aspects, include the following. A second triangular protrusion extends along a pivot axis of the fork linkage. A point of the second protrusion is in-line with the pivot axis. The point of the first protrusion points substantially in the opposite direction of the point of the first protrusion. A second triangular receptacle defines a profile to receive the second triangular protrusion. An angle of the second triangular receptacle is greater than an angle of the point of the second protrusion. The angle of the second triangular receptacle terminates along the pivot axis.

Aspects of the example wheel coupling, which can be combined with the wheel coupling alone or in other aspects, include the following. The forked end includes the following features. Spline clutch retainers are configured to retain the spline clutch. The spline clutch retainers are configured to allow rotational movement along a first rotational axis parallel to a pivot axis of the linkage. The spline clutch retainers are configured to allow rotational movement along a second rotational axis along the circular center of the spline coupling.

Aspects of the example wheel coupling, which can be combined with the wheel coupling alone or in other aspects, include the following. The spline clutch retainers include the following features. A trunnion mount is configured to be received by the forked end. A profile, opposite of the trunnion, is configured to receive and at least partially retain the spline coupling.

Aspects of the example wheel coupling, which can be combined with the wheel coupling alone or in other aspects, include the following. A worm gear is rotably coupled to a shaft of the electric motor. A pinion gear is directly coupled to the cam. The pinion gear is engaged with the worm gear such that rotation of the worm gear imparts rotation on the pinion gear and cam.

Aspects of the example wheel coupling, which can be combined with the wheel coupling alone or in other aspects, include the following. A cam position sensor is included.

Aspects of the example wheel coupling, which can be combined with the wheel coupling alone or in other aspects, include the following. The cam position sensor includes the following features. A first magnet and a second magnet are on opposite sides of a cam shaft from one another. The second magnet has an opposite polarity from the first magnet. A Hall Effect sensor is adjacent to the cam. The Hall Effect sensor is configured to detect the polarity of the first magnet or the second magnet. The Hall Effect sensor is configured to produce an output indicative of the cam position.

Aspects of the example wheel coupling, which can be combined with the wheel coupling alone or in other aspects, include the following. A spline position sensor is included.

Aspects of the example wheel coupling, which can be combined with the wheel coupling alone or in other aspects, include the following. The spline position sensor includes the following features. A magnet is at the control end. A Hall Effect sensor is configured to determine a position of the control end relative to the sensor. The Hall Effect sensor is configured to produce an output indicative of an engagement position of the spline coupling.

Aspects of the example wheel coupling, which can be combined with the wheel coupling alone or in other aspects, include the following. An electric motor is arranged to rotate the cam. A cam position sensor is configured to produce a first output indicative of the cam position. A spline position sensor is configured to produce a second output indicative of an engagement position of the spline coupling. A controller is configured to receive the first output from the cam position sensor. The controller is configured to receive the second output from the spline position sensor. The controller is configured to determine the position of the cam based on the received first output. The controller is configured to determine a status of a wheel coupling based on the received second output.

Aspects of the example wheel coupling, which can be combined with the wheel coupling alone or in other aspects, include the following. The controller is further configured to determine a stalled actuation, based on the received first output and the received second output, and begin thermal management of the electric motor responsive to the determined stall condition.

An example implementation of the subject matter described within this disclosure is a method with the following features. A wheel hub is engaged to a drive axle by a spline coupling at a first rate. The wheel hub is disengaged from the drive axle by the spline coupling at a second rate.

Aspects of the example method, which can be combined with the example method alone or in combination with other aspects, include the following. The second rate is slower than the first rate.

Aspects of the example method, which can be combined with the example method alone or in combination with other aspects, include the following. Engaging the wheel hub to the drive axle includes the following. A cam is rotated. An end of a linkage is translated by a bias responsive to rotating the cam. The spline coupling is laterally translated responsive to translating the end of the linkage.

Aspects of the example method, which can be combined with the example method alone or in combination with other aspects, include the following. Engaging the wheel hub to the drive axle includes the following. Disengaging the wheel hub from the drive axle includes the following features. A cam is rotated. An end of a linkage is translated by the rotating cam. The spline coupling is laterally translated responsive to translating the end of the linkage.

Aspects of the example method, which can be combined with the example method alone or in combination with other aspects, include the following. A stalled actuation of the spline coupling is determined. Thermal management of an electric motor is begun responsive to the determined stall condition.

An example implementation of the subject matter described in this disclosure is a vehicle with the following features. An actuable wheel coupling is configured to actuably couple a wheel hub and a drive axle to rotate in unison with one another. The actuable wheel coupling includes an axially translatable spline coupling configured to be translated between an engaged position and a disengaged position. The engaged position couples the wheel hub and drive axle. The disengaged position decouples the wheel hub and drive axle. A forked linkage includes a forked end and a control end. The axially translatable spline coupling is supported and carried by the forked end. A pivot is between the forked end and the control end. A cam is configured to interact with the control end of the forked linkage. The cam includes a profile that defines an axial position of the spline coupling relative to an angular position of the cam. A bias biases the control end towards the cam.

Aspects of the example vehicle, which can be combined with the example vehicle alone or in combination with other aspects, include the following. The profile is configured to axially translate the spline coupling, at a first rate, into an engaged position and axially translate the spline coupling, at a second rate slower than the first rate, into a disengaged position.

Aspects of the example vehicle, which can be combined with the example vehicle alone or in combination with other aspects, include the following. The profile is configured to axially translate the spline coupling, at a rate, into an engaged position and axially translate the spline coupling, at the rate, into a disengaged position.

Aspects of the example vehicle, which can be combined with the example vehicle alone or in combination with other aspects, include the following. A roller is attached to the control end of the cam. The roller contacts the cam during normal operation. The roller is coupled to the control end such that the roller translates in unison with the control end.

Aspects of the example vehicle, which can be combined with the example vehicle alone or in combination with other aspects, include the following. The forked end includes spline clutch retainers configured to retain the spline clutch. The spline clutch retainers are configured to allow rotational movement along a first rotational axis parallel to a pivot axis of the linkage. The spline clutch retainers are configured to allow rotational movement along a second rotational axis along the circular center of the spline coupling.

Aspects of the example vehicle, which can be combined with the example vehicle alone or in combination with other aspects, include the following. The spline clutch retainers include the following features. A trunnion mount is configured to be received by the forked end. A profile, opposite of the trunnion, is configured to receive and at least partially retain the spline coupling.

Aspects of the example vehicle, which can be combined with the example vehicle alone or in combination with other aspects, include the following. A worm gear is rotably coupled to a shaft of an electric motor. A pinion gear is directly coupled to the cam. The pinion gear is engaged with the worm gear such that rotation of the worm gear imparts rotation on the pinion gear and cam.

Aspects of the example vehicle, which can be combined with the example vehicle alone or in combination with other aspects, include the following. A cam position sensor is included.

Aspects of the example vehicle, which can be combined with the example vehicle alone or in combination with other aspects, include the following. The cam position sensor includes a first magnet at a first side of the cam. A second magnet is at a second side of the cam opposite a cam shaft from the first magnet. The second magnet has an opposite polarity from the first magnet. A Hall Effect sensor is adjacent to the cam. The Hall Effect sensor is configured to detect the polarity of the first magnet or the second magnet. The Hall Effect sensor is configured to produce a cam position stream indicative of the cam position.

Aspects of the example vehicle, which can be combined with the example vehicle alone or in combination with other aspects, include the following. A spline position sensor is included.

Aspects of the example vehicle, which can be combined with the example vehicle alone or in combination with other aspects, include the following. The spline position sensor includes a magnet at the control end. A Hall Effect sensor is configured to determine a position of the control end relative to the sensor. The Hall Effect sensor is configured to produce an engagement position stream indicative of an engagement position of the spline coupling.

Aspects of the example vehicle, which can be combined with the example vehicle alone or in combination with other aspects, include the following. An electric motor is arranged to rotate the cam. A cam position sensor is configured to produce a first output indicative of the cam position. A spline position sensor is configured to produce a second output indicative of an engagement position of the spline coupling. A controller is configured to receive the first output from the cam position sensor. The controller is configured to receive the second output from the spline position sensor. The controller is configured to determine the position of the cam based on the received first output. The controller is configured to determine a status of a wheel coupling based on the received second output.

Aspects of the example vehicle, which can be combined with the example vehicle alone or in combination with other aspects, include the following. The controller is further configured to determine a stalled actuation, based on the received first output and the received second output, and begin thermal management of the electric motor responsive to the determined stall condition.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

As electrification of vehicles become more common, many pneumatic, vacuum, and/or hydraulic systems must be converted to electric as well. Such changes are particularly important on fully electric vehicles as electric motors and batteries do not produce the vacuum that many auxiliary systems of internal combustion vehicles rely upon. This disclosure describes an electric actuable wheel coupling. The electric actuable wheel coupling includes an electric motor that is coupled to a forked linkage. The forked linkage includes a forked end and a control end. An axially translatable spline coupling is supported and carried by the forked end. A pivot is between the forked end and the control end. A cam is configured to interact with the control end of the forked linkage. The cam include a profile that defines an axial position of the spline coupling relative to an angular position of the cam. A bias biases the control end towards the cam.

Figure 1:
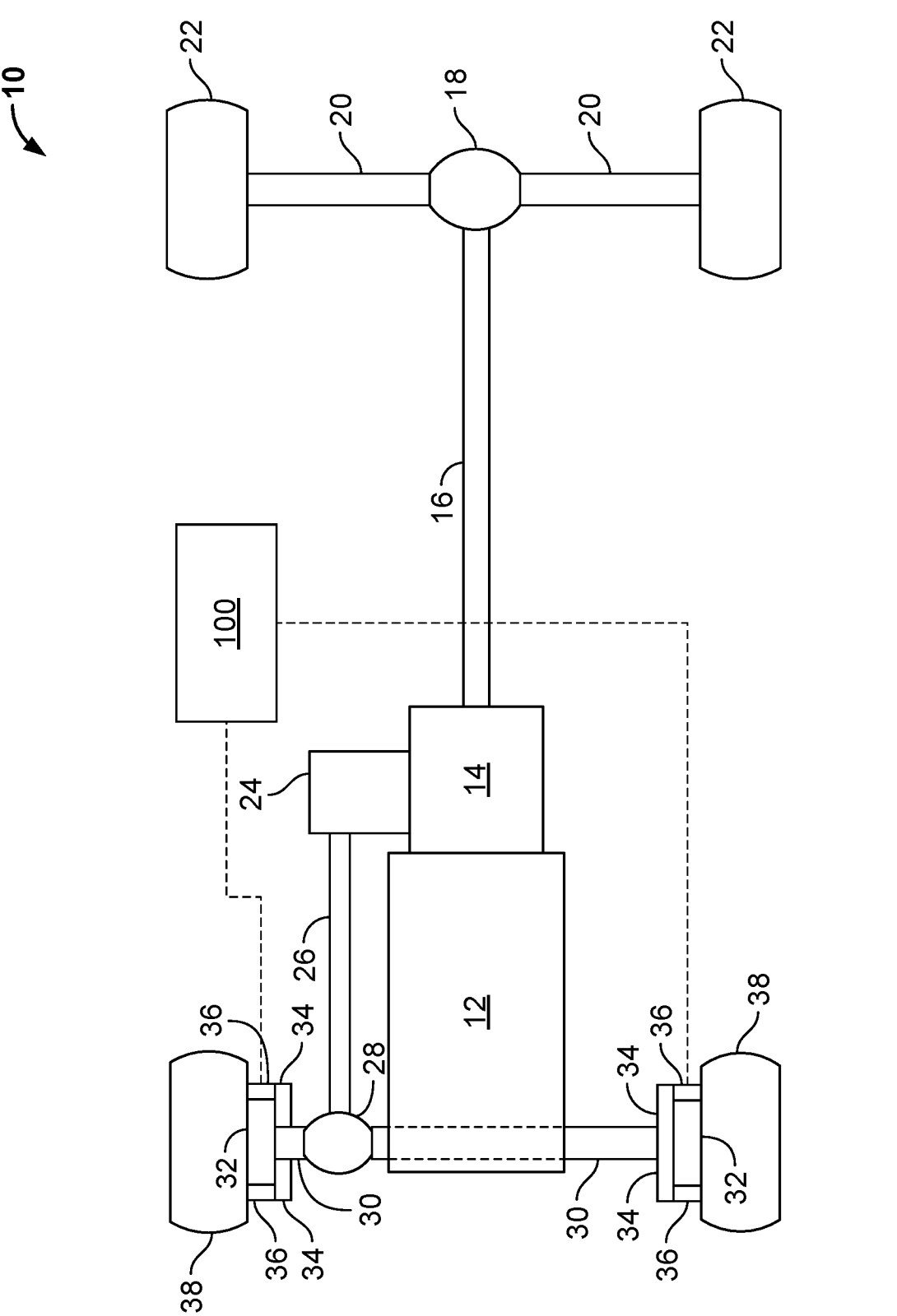
FIG. 1 is a schematic diagram of an example vehicle.

FIG. 1 is a schematic view of a four-wheel drive vehicle 10 using an axle system that can be used with aspects of this disclosure. The vehicle 10 includes a motor 12 configured to generate a rotation output. The vehicle 10 further includes a transmission 14 coupled to the motor 12. The transmission 14 is configured to receive the rotational output from the motor 12. The vehicle 10 further includes a propeller shaft 16 coupled to the transmission 14 and receives rotational input therefrom. The propeller shaft 16 rotates a differential 18. In turn, the differential 18 rotates axles 20 coupled to a set of wheels 22 (e.g., rear wheels). Therefore, the propeller shaft 16 is coupled to the differential 18 and the differential 18 is coupled to the axles 20. The set of wheels 22 may be referred to as drive wheels.

The vehicle 10 further includes a transfer case 24 coupled to the transmission 14 and is configured to receive rotational output therefrom. The transfer case 24 rotates a second propeller shaft 26. The second propeller shaft 26 is coupled to a second differential 28 coupled to the axles 30 and transfer rotational input thereto. Each of the axles 30 are coupled to locking hub systems 32. Each of the locking hub systems 32 are rotationally coupled to the axles 30. The locking hub systems 32 are coupled to wheel bearings 34 and wheel attachment interfaces 36. The vehicle 10 further includes wheels 38 coupled to the wheel attachment interfaces 36. The wheel bearings 34, wheel attachment interfaces 36, and wheels 38 may be included in a wheel assembly.

The locking hub systems 32 are constructed to enable the wheels 38 to freely rotate in a disengaged configuration and constructed to enable rotational force to be transferred from the axles 30 to the wheels 38 in an engaged configuration. In this way, a second set of wheels may be enabled and disabled as drive wheels, providing optional two-wheel drive and four-wheel drive configurations in the vehicle 10. It will be appreciated that the locking hub systems 32 may be manually actuated to reconfigure the systems in the engaged configuration and disengaged configuration. Alternatively or in addition, greater or fewer locking hub systems 32 can be included in the four-wheel drive vehicle 10. While primarily described as being used with a four-wheel drive vehicle, the locking hub systems 32 can be used with other drive arrangements as well, such as a two-wheel drive vehicle or a six-wheel drive vehicle. In some implementations, the locking hub systems 32 can be coupled to a controller 100. The controller 100 is configured to actuate the locking hub systems 32.

In some implementations, a single actuable locking hub system 32 is included on an axle. In such implementations, a single locking hub system 32, or hub lock, is at a first end of the axles 30 while a wheel hub connecting device (not illustrated) is at a second end of the axles 30.

While primarily described as a single motor system with a transfer case, other arrangements are possible without departing from this disclosure, for example, a two motor arrangement (one motor coupled to the axle 20 and one coupled to the axle 30) can be used without departing from this disclosure. Similarly, the subject matter described herein is applicable to three and four motor systems.

Figure 2:
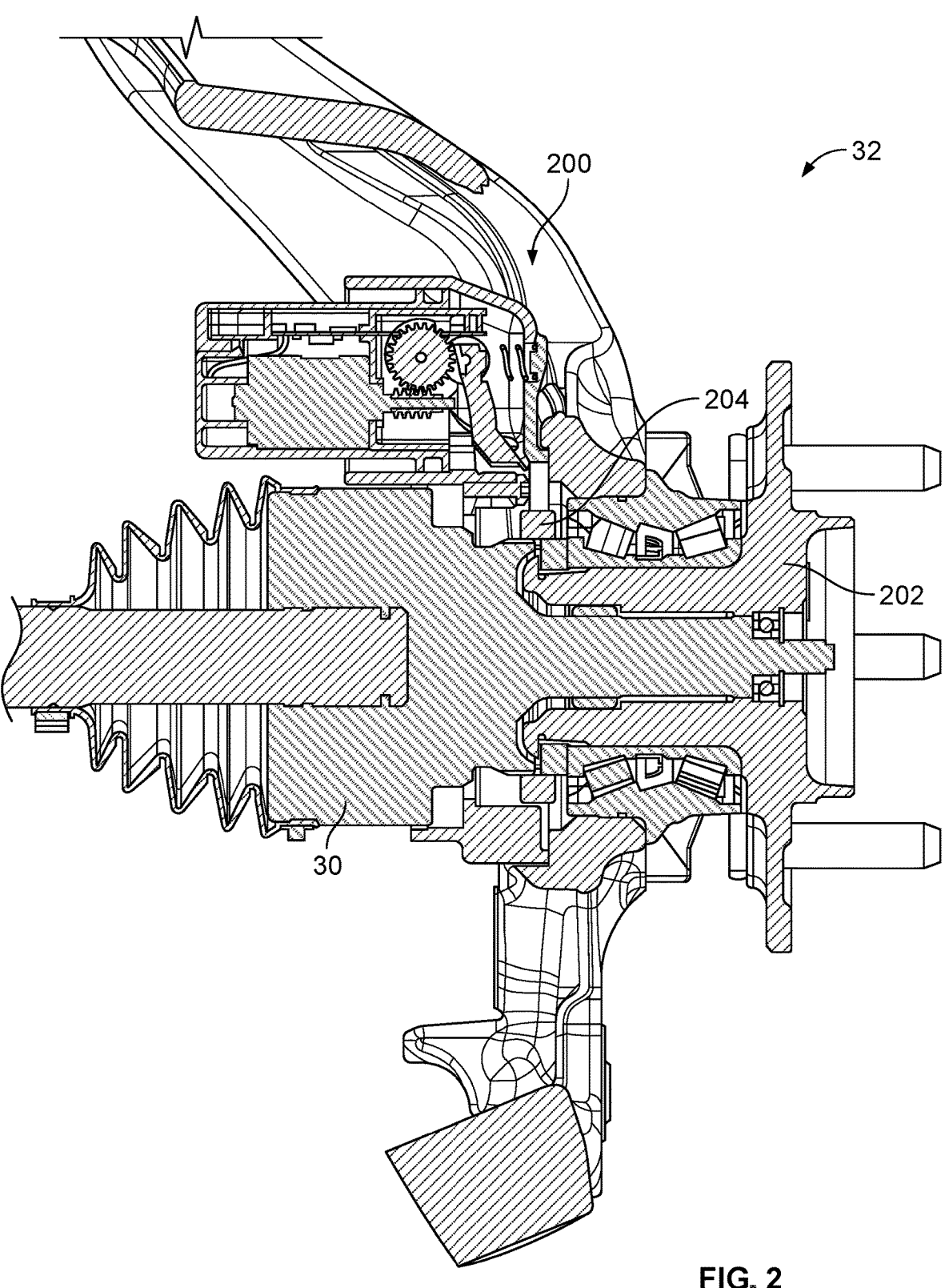
FIG. 2 is a side cross-sectional view of an example wheel hub and axle.

FIG. 2 is a side cross-sectional view of an example locking wheel hub system 32. The locking hub system 32 includes an actuable wheel coupling 200 configured to actuably couple the wheel hub 202 and the drive axle 30 to rotate in unison with one another. Such a feat is accomplished by axially moving a spline coupling 204 such that the spline coupling provides an interference coupling the axle 30 and the wheel hub 202 to rotate in unison. In instances where the actuable wheel coupling 200 decouples the wheel hub 202 and the drive axle 30, the spline coupling 204 is axially translated such that the spline coupling 204 is only in contact with the drive axle 30 or the wheel hub 202, not both. The removal of the interference coupling decouples the axle 30 and the wheel hub 202

Figures 3A, 3B:
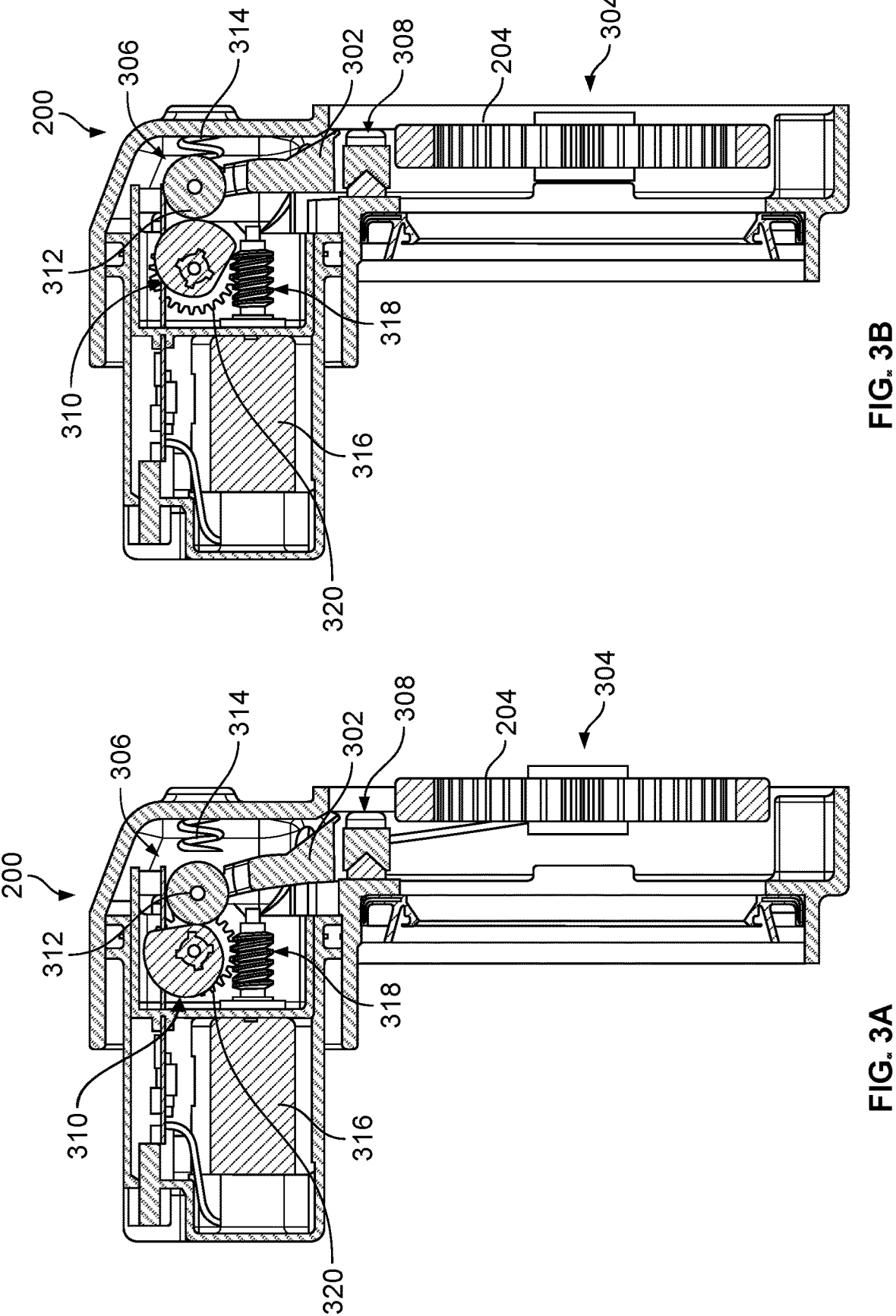
FIGS. 3A and 3B are side cross-sectional diagrams of example wheel hub couplers in the engaged and disengaged positions.

FIGS. 3A and 3B are side cross-sectional diagrams of example actuable wheel hub couplers 200 in the engaged (FIG. 3A) and disengaged (FIG. 3B) positions respectively. The actuable wheel coupling 200 includes the axially translatable spline coupling 204 that is translated by a forked linkage 302. The forked linkage 302 includes a forked end 304 and a control end 306. The axially translatable spline coupling 204 is supported and carried by the forked end 304. The forked linkage includes a pivot 308 between the forked end 304 and the control end 306. More details on the forked linkage are described later within this disclosure.

A cam 310 is configured to interact with the control end 306 of the forked linkage 302. The cam 310 includes a perimeter profile that defines an axial position of the spline coupling 204 relative to an angular position of the cam 310.

That is, as the cam 310 rotates, the spline coupling is moved laterally in response. While the cam 310 is primarily illustrated and described as an asymmetric cam within this disclosure, other cam profiles, including symmetric profiles, can be used without departing from this disclosure. Regardless of the profile of the cam 310, the profile is configured to axially translate the spline coupling into an engaged position at a first rate and axially translate the spline coupling 204 into a disengaged position at a second rate. Depending upon the profile of the cam, the first rate can be the same as the second rate, or different than the second rate. In the illustrated implementation, the asymmetric cam produces a first rate, and a second rate that is slower than the first rate.

A roller 312 is attached to the control end 306 of the forked linkage 302. The roller contacts the cam 310 during normal operation. The roller 312 is coupled to the control end 306 such that the roller 312 translates in unison with the control end 306. The roller 312 maintains contact with the cam 310 by a bias 314 that biases the control end 306 toward the cam 310. In some implementations, the bias 314 can include a compression spring or a tension spring.

The actuable wheel hub coupler 200 is driven by an electric motor 316. A shaft of the electric motor 316 is directly coupled to a worm gear 318. A pinion gear 320 is directly coupled to the cam 310 such that the cam rotates in unison with the pinion gear 320. The pinion gear 320 is engaged with the worm gear 318 such that rotation of the worm gear 318 imparts rotation on the pinion gear 320 and cam 310.

Figures 4A, 4B:
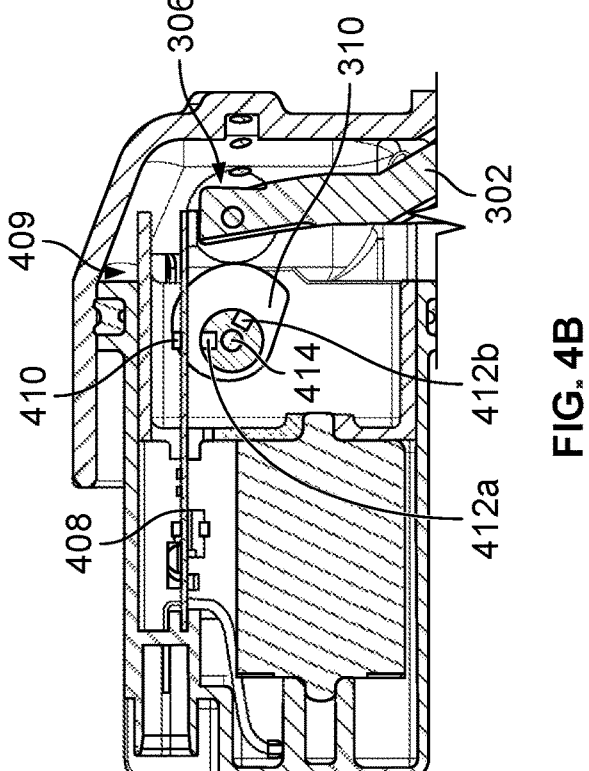
FIG. 4A is a side cross-sectional diagram illustrating an example spline position sensor.
FIG. 4B is a side cross-sectional diagram illustrating an example cam position sensor.

FIG. 4A is a side cross-sectional diagram illustrating an example spline position sensor arrangement (in some cases this sensor can also be referred to as a shift fork position sensor). In some implementations, the spline position sensor 402 takes a measurement at the control end 306 of the forked linkage 302. In some implementations, the spline position sensor arrangement includes the following features. A magnet 404 is located at the control end 306. A Hall Effect sensor 406 is located on a control board 408 within the actuable wheel coupling 200 and within sufficient proximity to the magnet such that the Hall Effect sensor 406 can sense the magnet 404. The Hall Effect sensor 406 is configured to determine a position of the control end 306 relative to the Hall Effect sensor 406. The Hall Effect sensor 406 is configured to produce an output indicative of an engagement position of the spline coupling 204. While primarily illustrated and described as using a Hall Effect sensor, other position sensors can be used without departing from this disclosure. For example, encoders or micro switches can be used with similar effect.

FIG. 4B is a side cross-sectional diagram illustrating an example cam position sensor arrangement. In the illustrated implementation, a cam position sensor 409 includes a Hall Effect sensor 410 on the control board 408 proximate to the cam 310. A first magnet 412a and a second magnet 412b are positioned on opposing sides of the cam 310. More specifically, the first magnet 412a and the second magnet 412b are located on opposite sides of a cam shaft 414. The first magnet 412a and the second magnet 412b are opposite polarities of one another. The Hall Effect sensor 410 is configured to detect the polarity of the first magnet 412a or the second magnet 412b. The Hall Effect sensor 410 is configured to produce an output indicative of the cam position. In some implementations, the Hall Effect sensor 410 is configured to output a binary signal. While primarily illustrated and described as using a Hall Effect sensor, other position sensors can be used without departing from this disclosure. For example, encoders or micro switches can be used with similar effect.

Figures 5A, 5B:
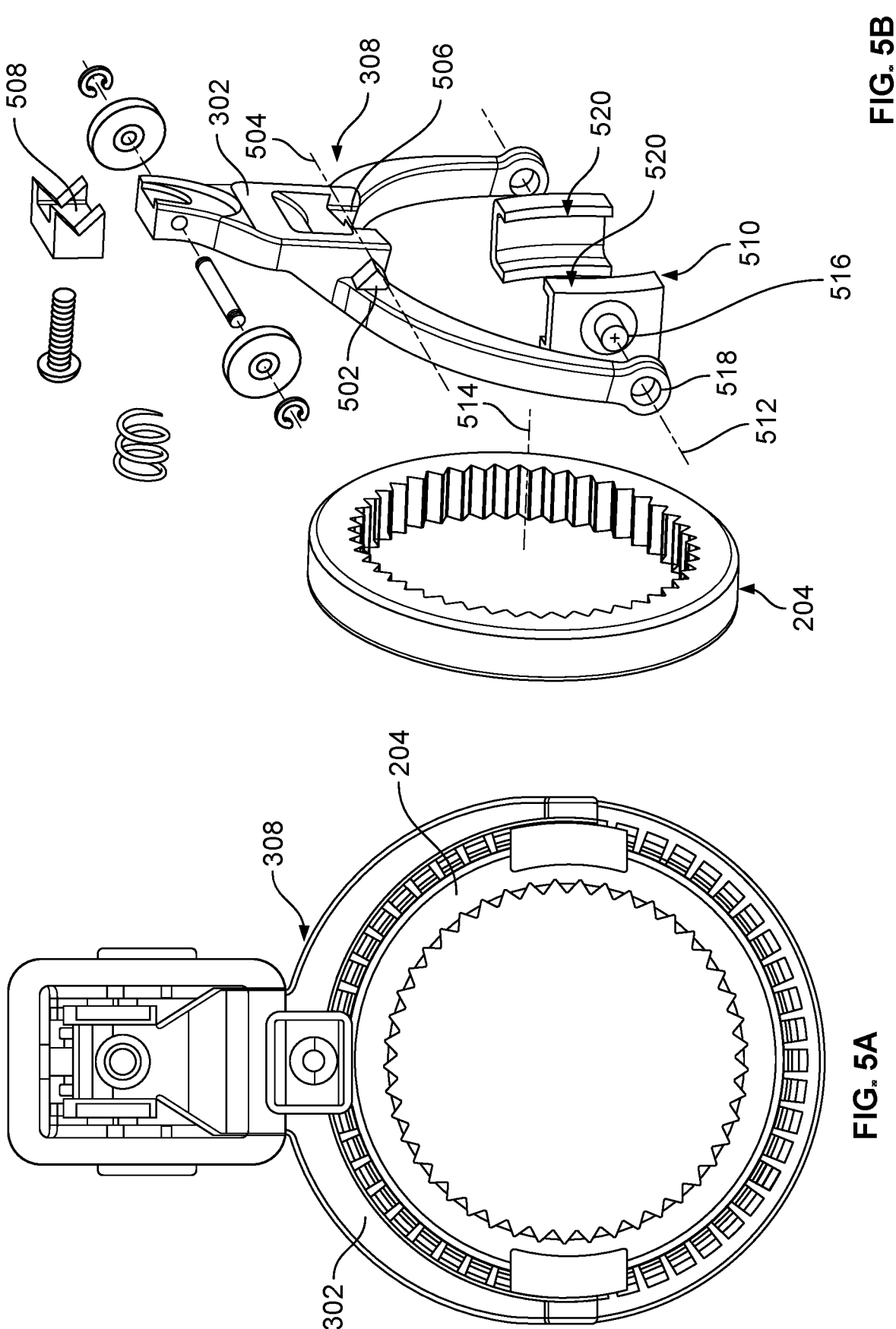
FIGS. 5A and 5B are planar and exploded views of an example linkage.

FIGS. 5A and 5B are planar and exploded views of an example forked linkage 302. The pivot 308 includes a first triangular protrusion 502 extending along a pivot axis 504 of the forked linkage 302. A point of the first triangular protrusion 502 is in-line with the pivot axis 504. Once assembled, the first triangular protrusion 502 rests within a first triangular receptacle (not shown, integrated into a housing). The first triangular receptacle defines a profile to receive the first triangular protrusion 502. An angle of the first triangular receptacle (at the point) is greater than an angle of the point of the first triangular protrusion 502. The angle of the first triangular receptacle terminates along the pivot axis 504.

In some implementations, the pivot includes a second triangular protrusion 506 extending along the pivot axis 504 of the fork linkage 302. A point of the second triangular protrusion 506 is in-line with the pivot axis 504. The point of the first protrusion is pointing substantially (within manufacturing tolerances that allow the pivot 308 to function) in the opposite direction of the point of the first triangular protrusion 502. A second triangular receptacle 508 defines a profile to receive the second triangular protrusion 506. An angle of the second triangular receptacle 508 is greater than an angle of the point of the second triangular protrusion 506. The angle of the second triangular receptacle 508 terminates along the pivot axis 504.

Spline clutch retainers 510 are located at the forked end. The spline clutch retainers 510 are configured to retain the spline clutch 204. The spline clutch retainers 510 are configured to allow rotational movement along a first rotational axis 512 parallel to the pivot axis 504 of the forked linkage 302. The spline clutch retainers 510 are configured to allow rotational movement along a second rotational axis 514 along the circular center of the spline coupling 204. The spline clutch retainers 510 themselves include a trunnion mount 516 configured to be received by receptacles 518 at the forked end 304. Opposite the trunnion 516, each spline clutch retainer 510 defines a profile 520 configured to receive and at least partially retain (as previously described) the spline coupling 204.

Figure 9:
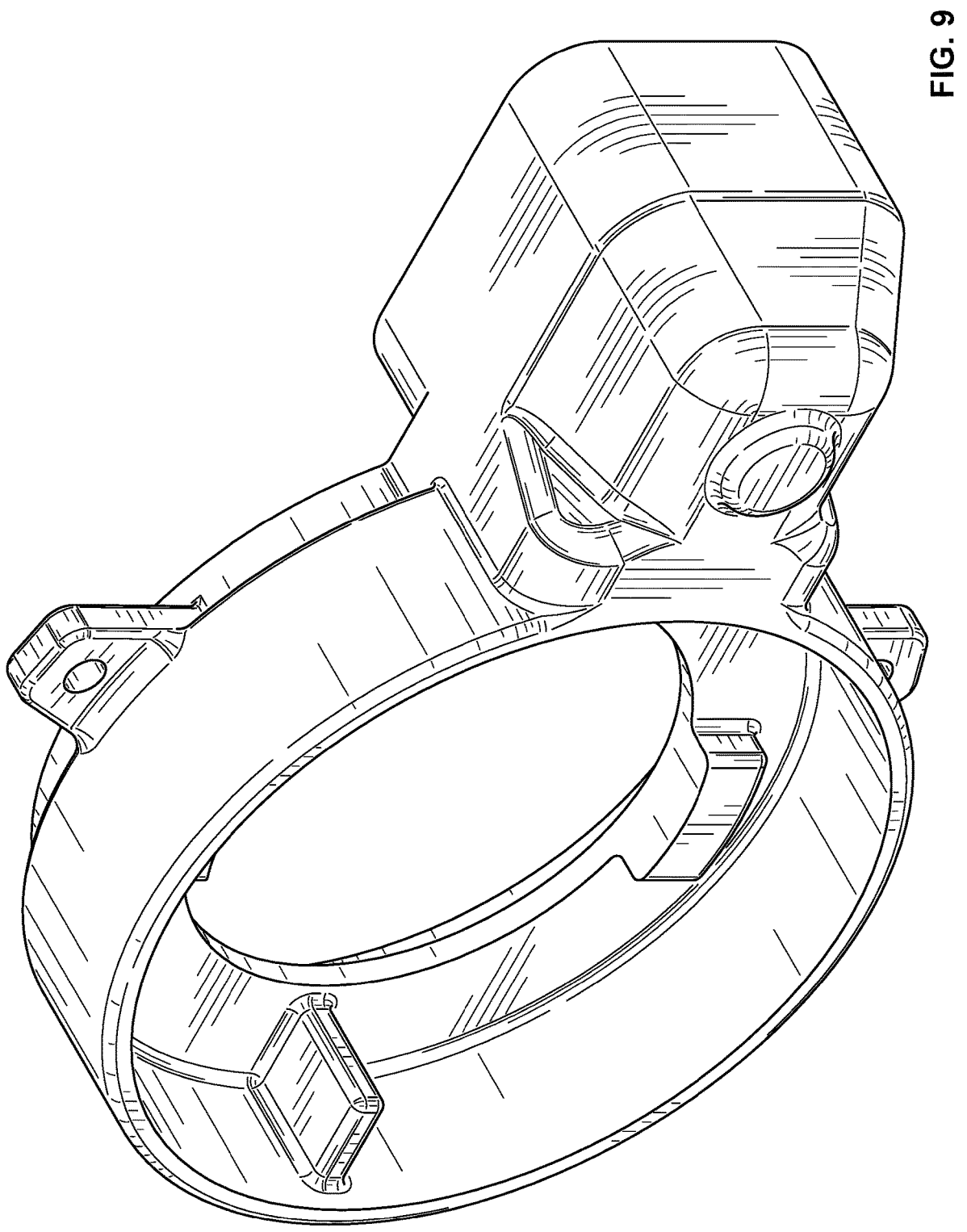
FIG. 9 is a front perspective view of a first embodiment of an example housing for a wheel hub coupler.
Figure 10:
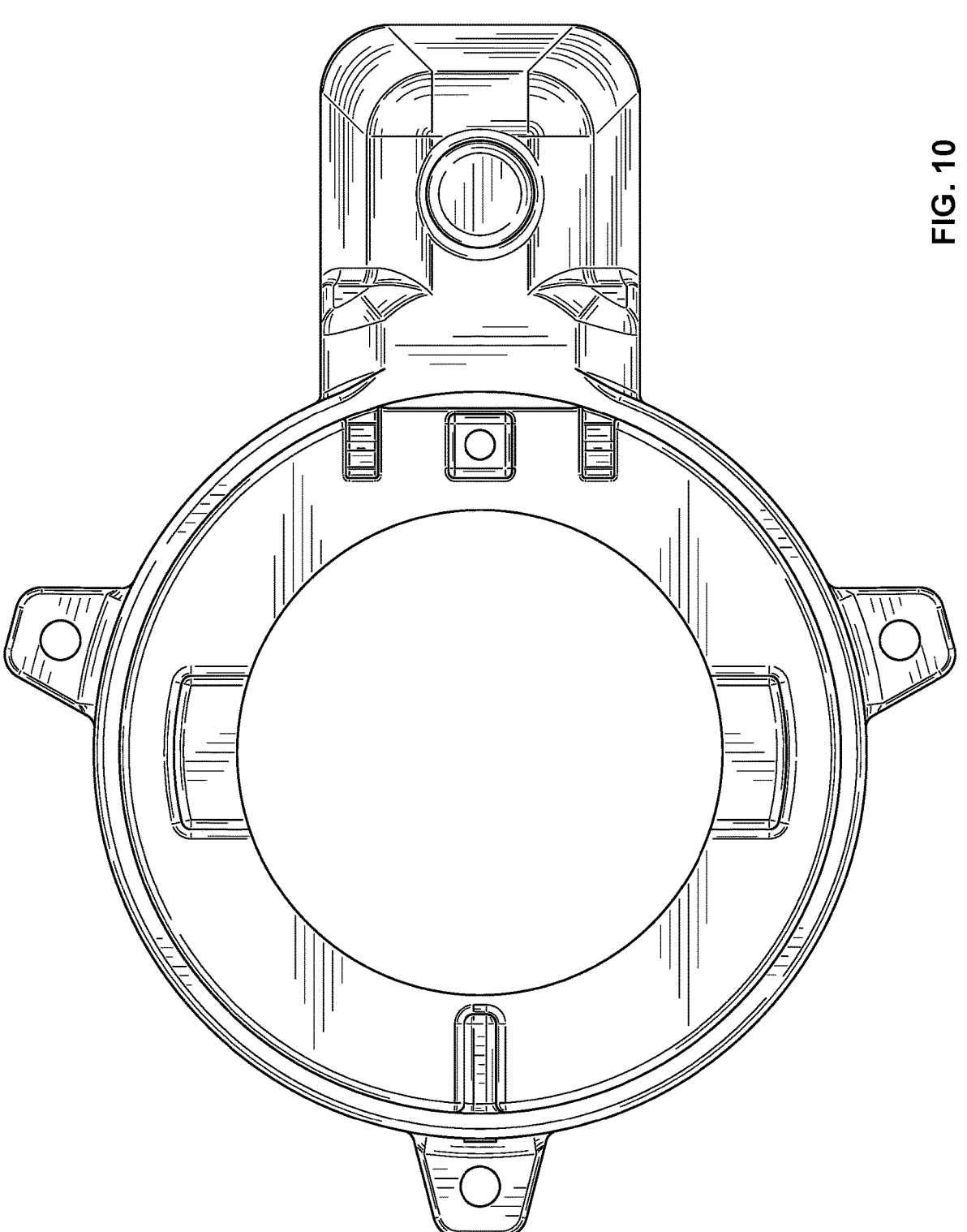
FIG. 10 is a front view of the housing shown in FIG. 9.
Figure 11:
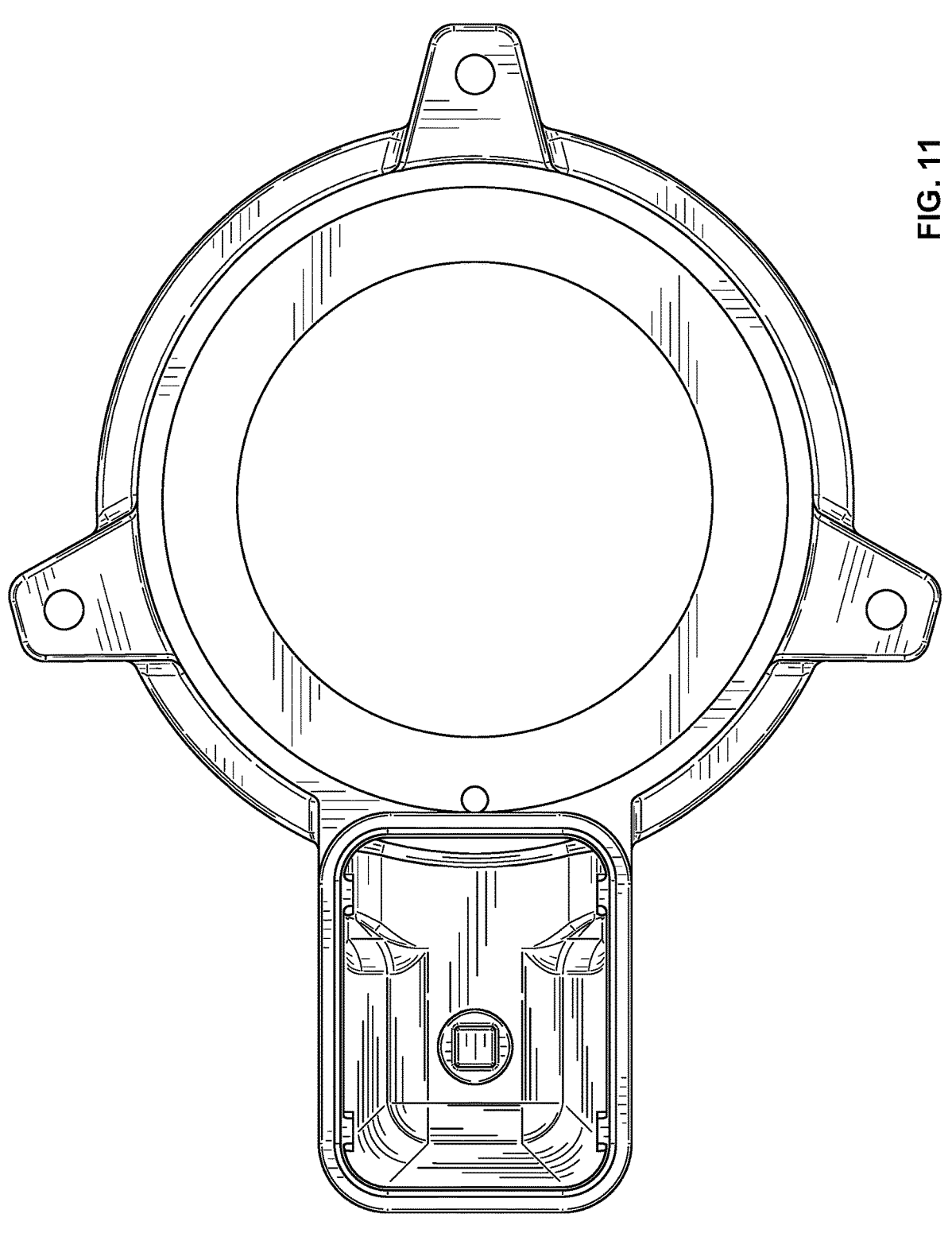
FIG. 11 is a back view of the housing shown in FIG. 9.
Figures 12, 13:
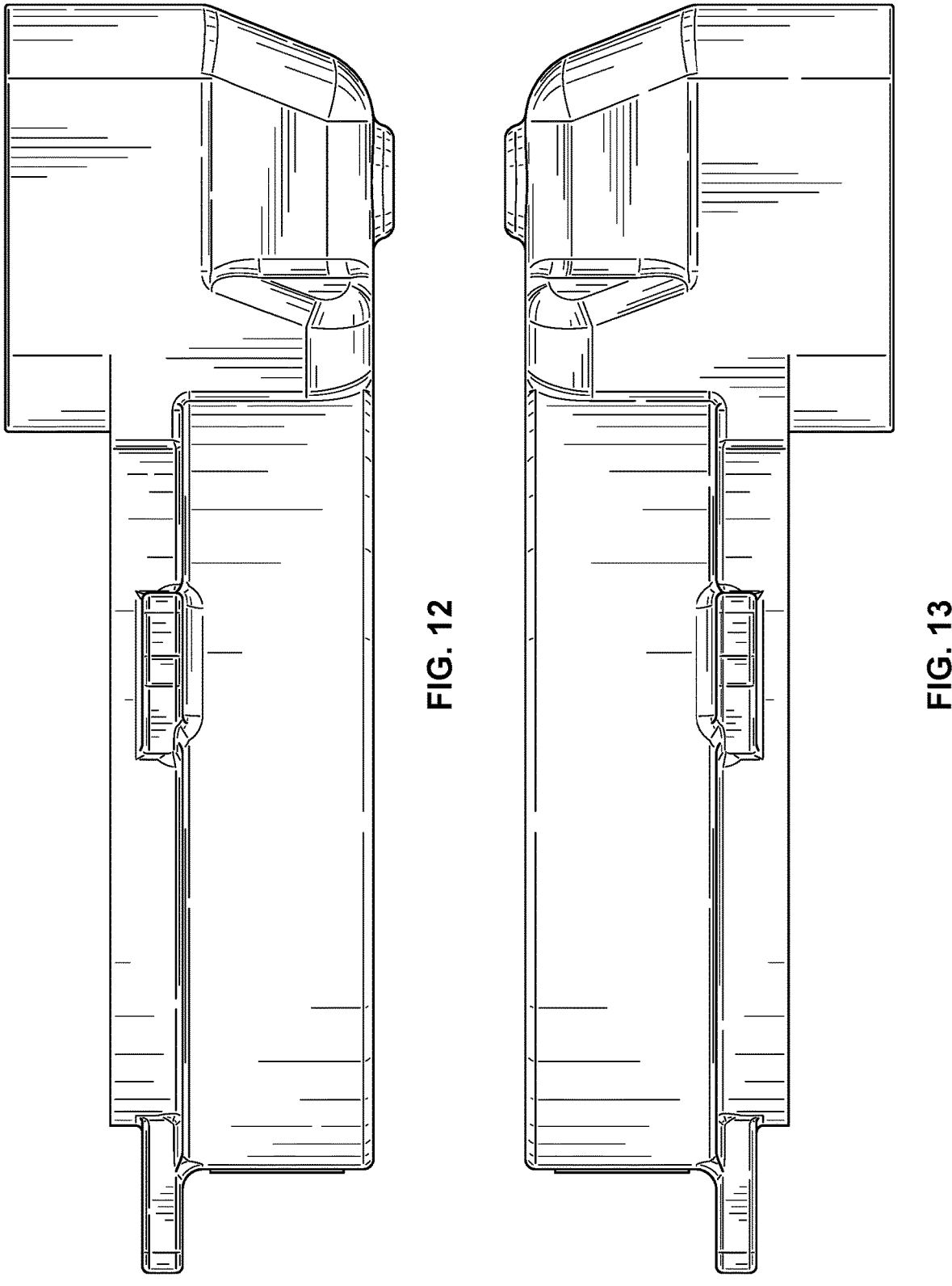
FIG. 12 is a top view of the housing shown in FIG. 9.
FIG. 13 is a bottom view of the housing shown in FIG. 9.
Figure 14:
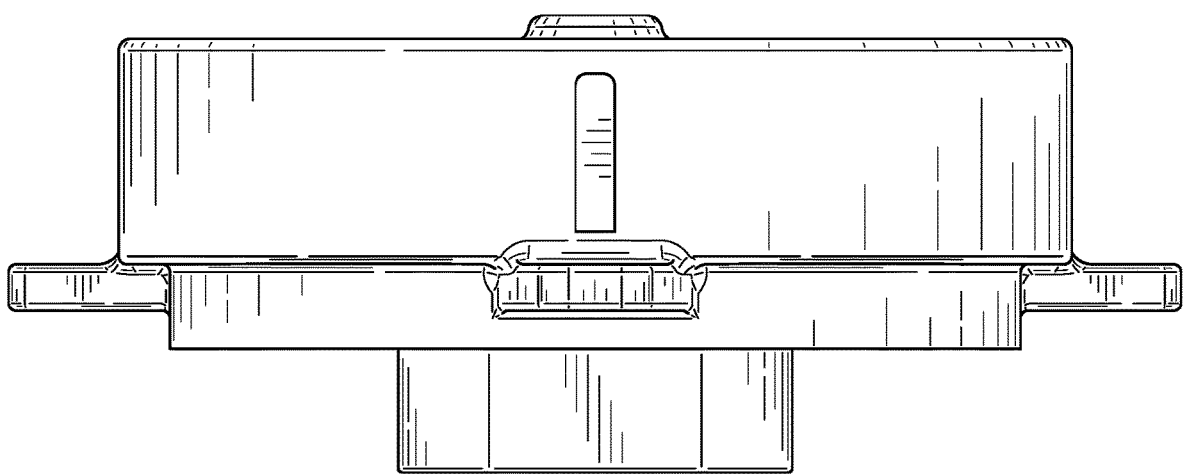
FIG. 14 is a left side view of the housing shown in FIG. 9.
Figure 15:
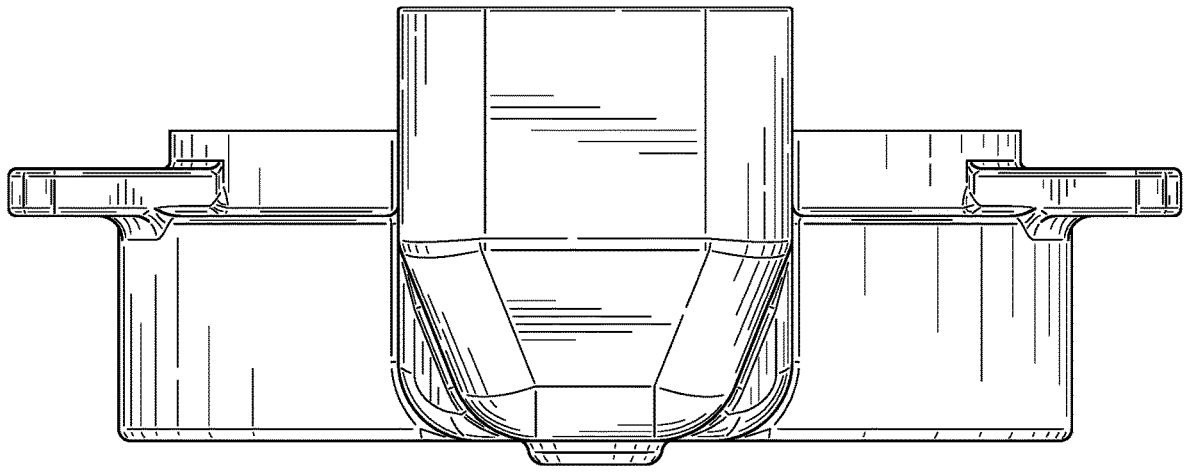
FIG. 15 is a right side view of the housing shown in FIG. 9.
Figure 16:
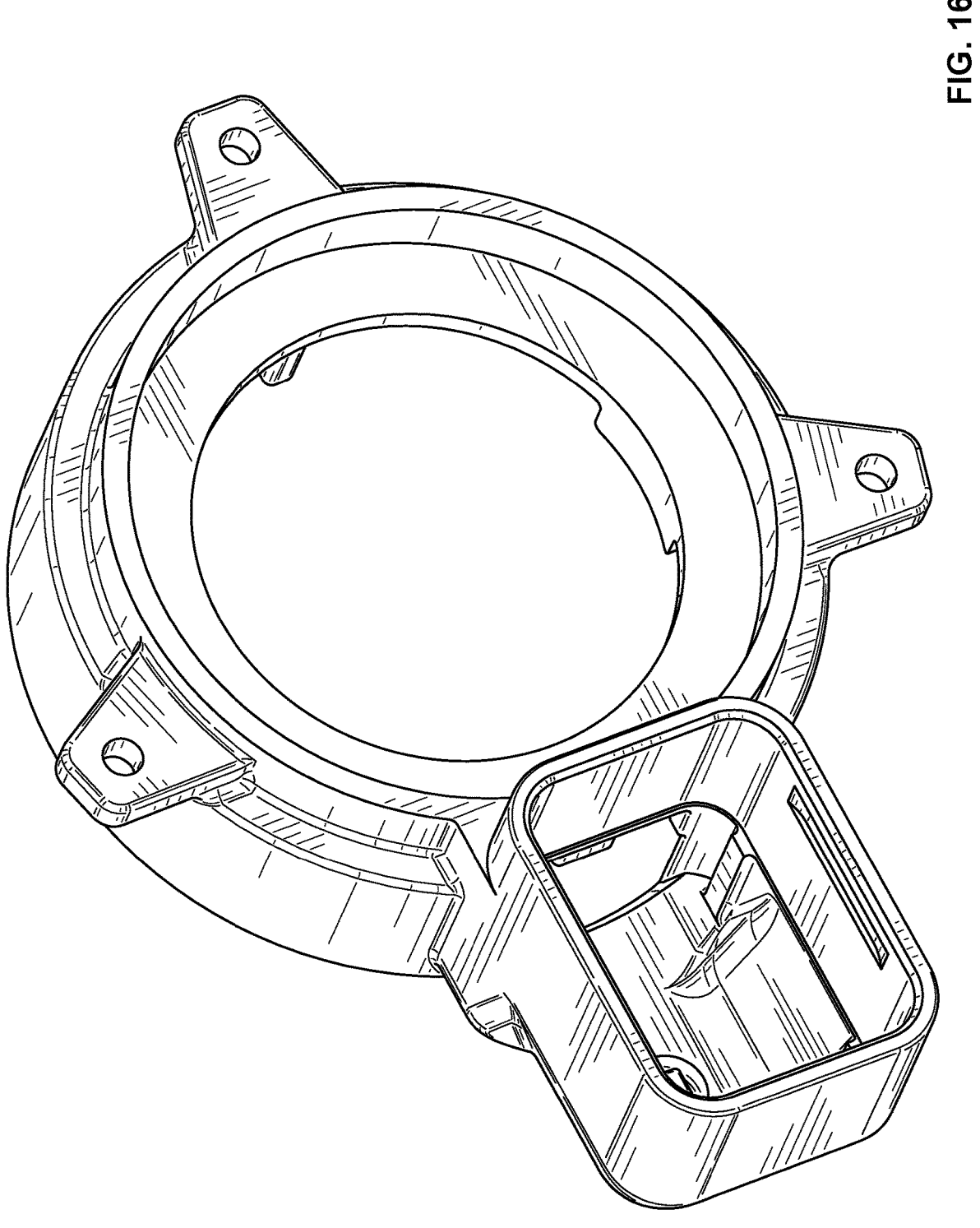
FIG. 16 is a back perspective view of the housing shown in FIG. 9.

The wheel hub coupler 200 also includes a housing. FIG. 9 is a front perspective view of a first embodiment of an example housing for a wheel hub coupler. FIG. 10 is a front view of the housing shown in FIG. 9. FIG. 11 is a back view of the housing shown in FIG. 9. FIG. 12 is a top view of the housing shown in FIG. 9. FIG. 13 is a bottom view of the housing shown in FIG. 9. FIG. 14 is a left side view of the housing shown in FIG. 9. FIG. 15 is a right side view of the housing shown in FIG. 9. FIG. 16 is a back perspective view of the housing shown in FIG. 9.

Figure 17:
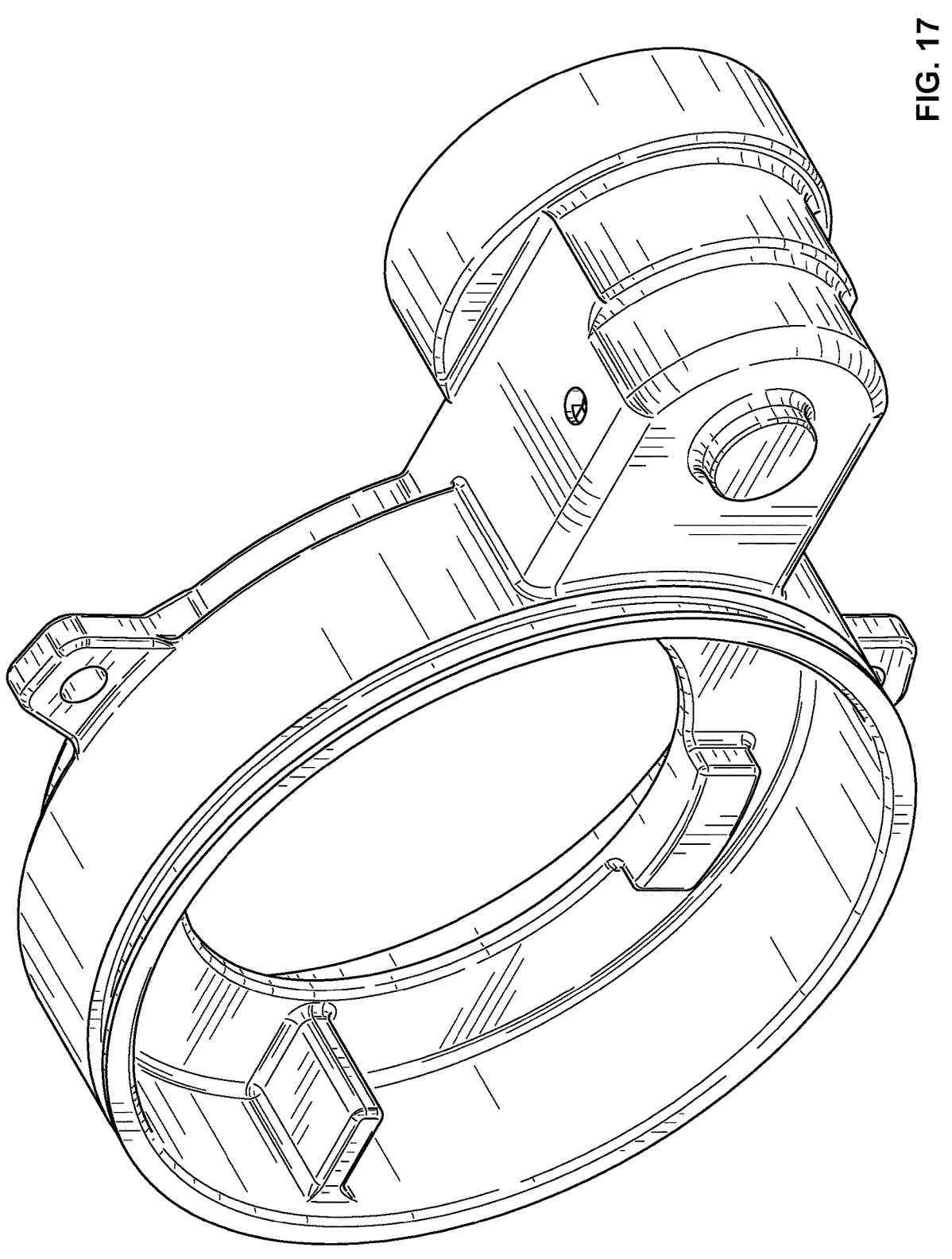
FIG. 17 is a front perspective view of a second embodiment of an example housing for a wheel hub coupler.
Figure 18:
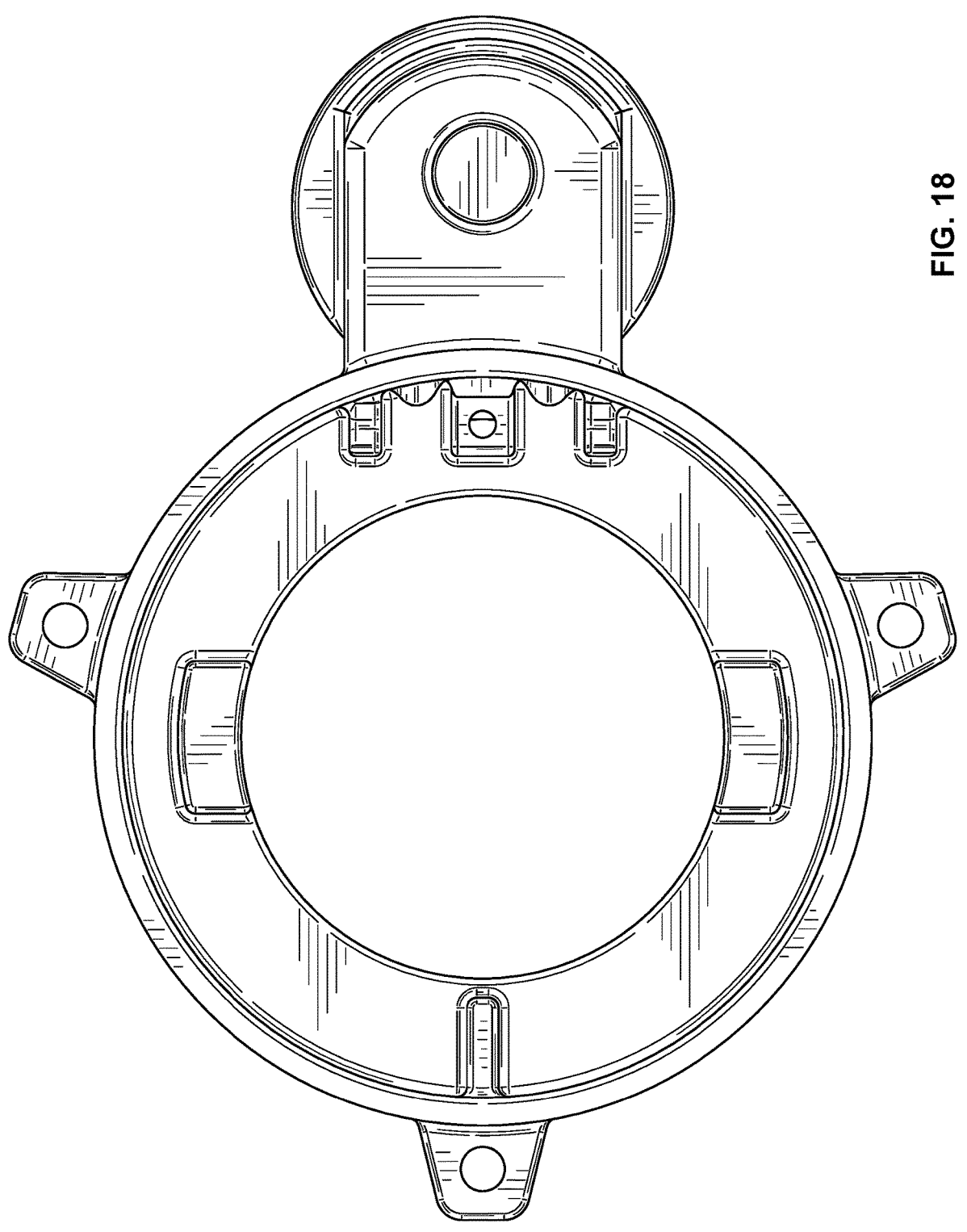
FIG. 18 is a front view of the housing shown in FIG. 17.
Figure 19:
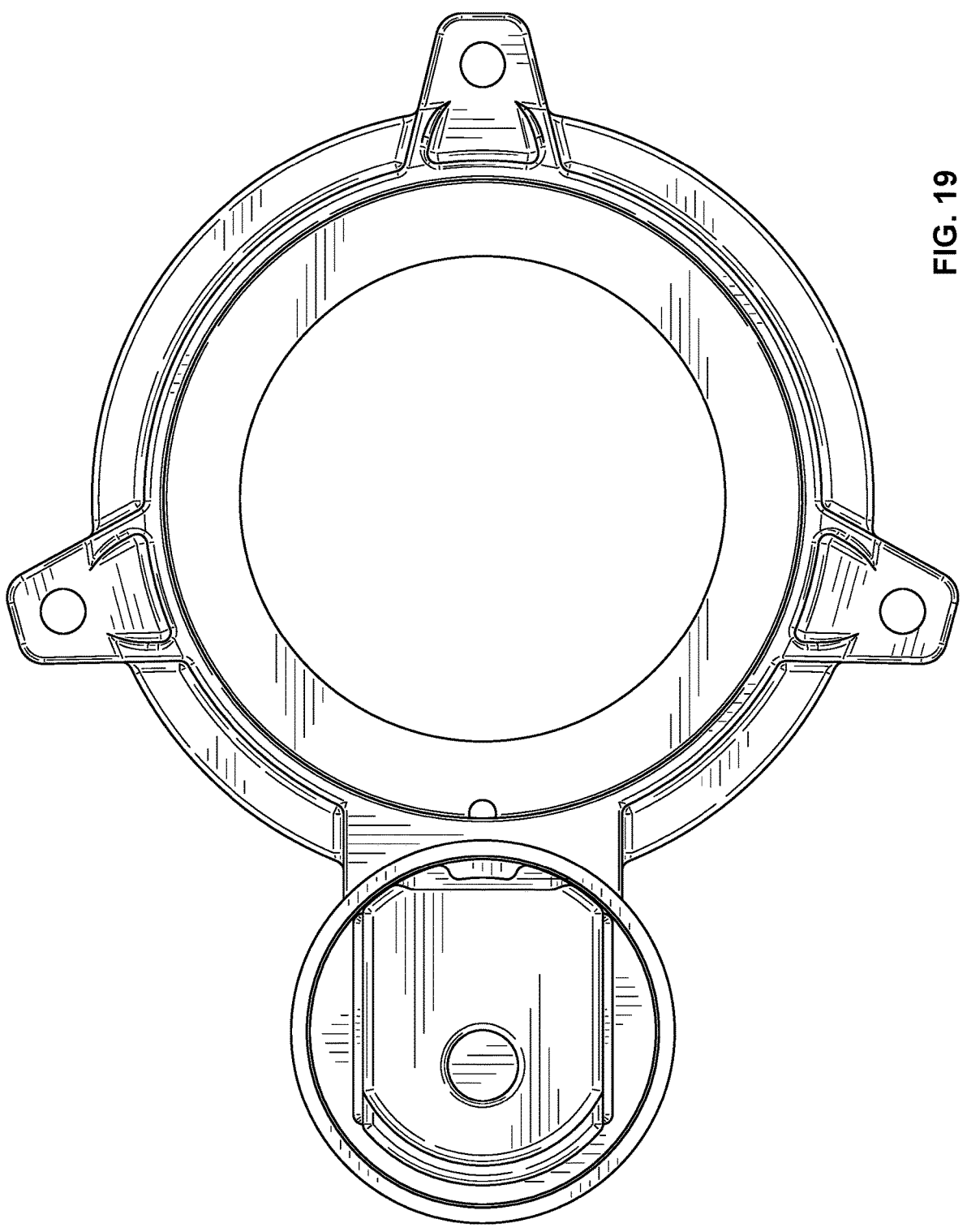
FIG. 19 is a back view of the housing shown in FIG. 17.
Figures 20, 21:
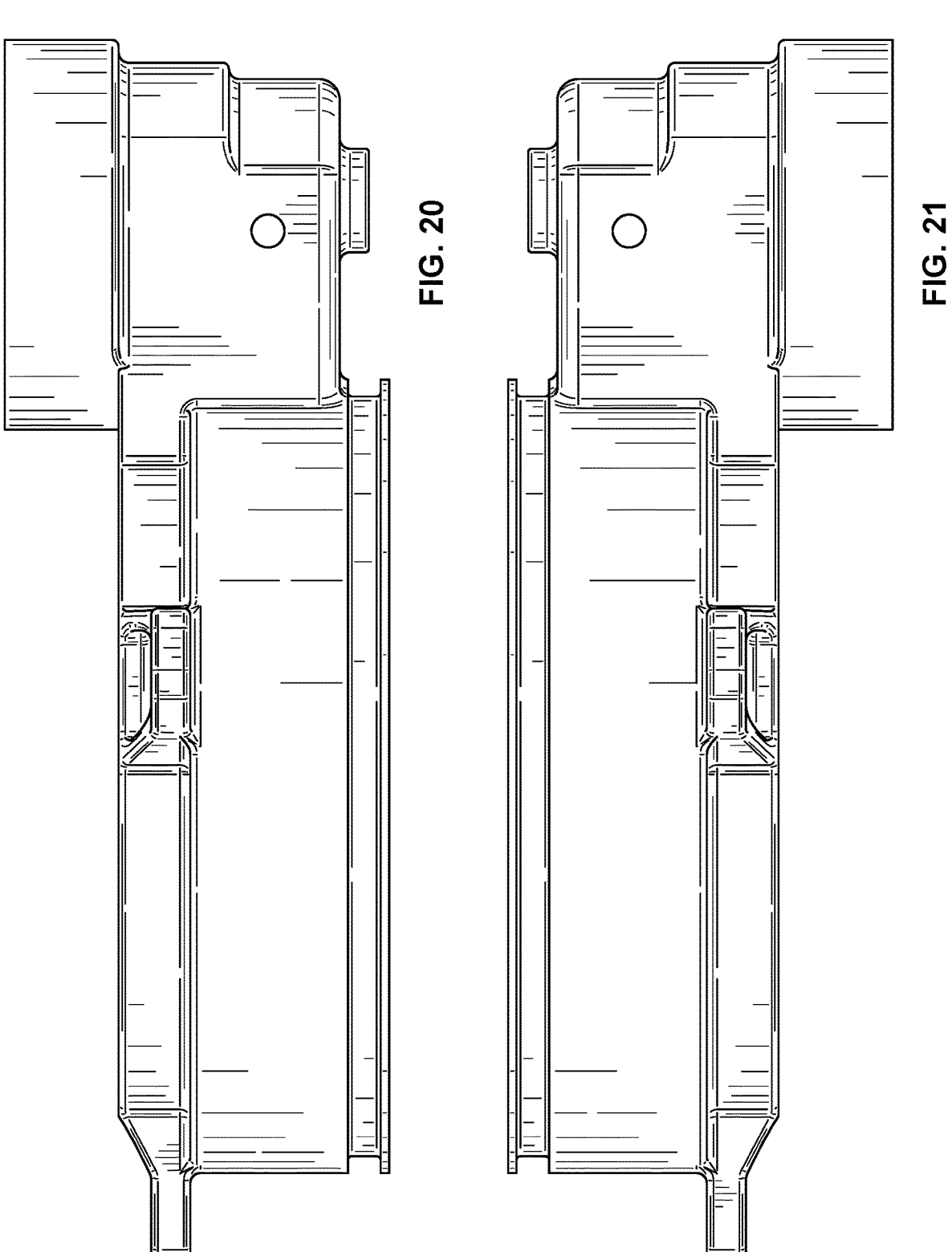
FIG. 20 is a top view of the housing shown in FIG. 17.
FIG. 21 is a bottom view of the housing shown in FIG. 17.
Figure 22:
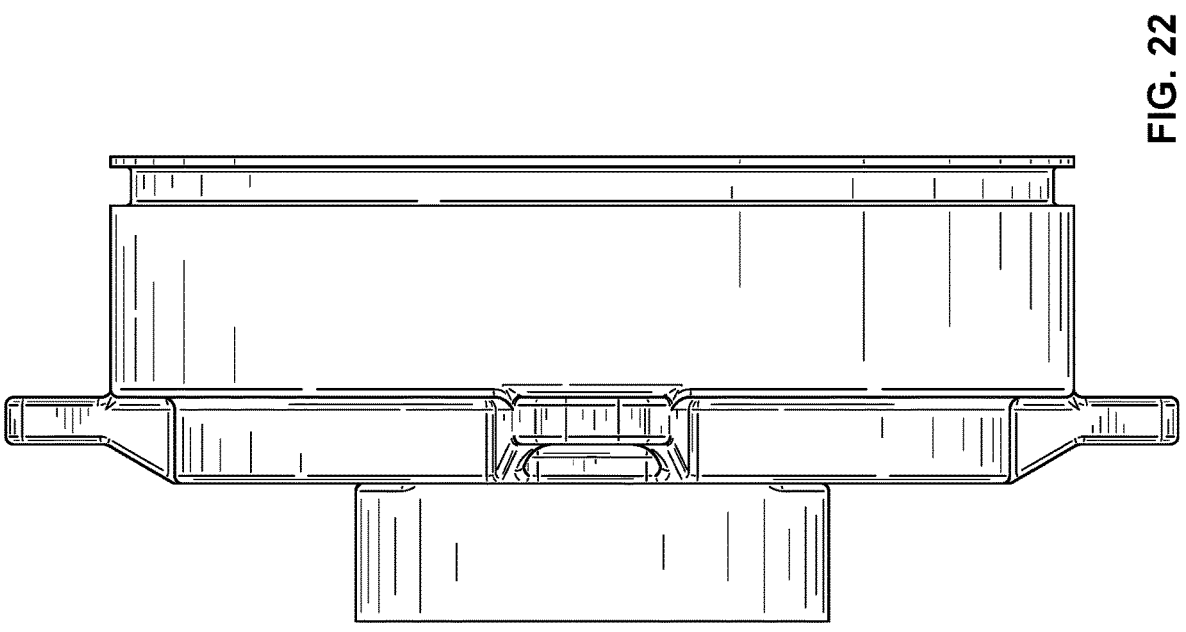
FIG. 22 is a left side view of the housing shown in FIG. 17.
Figure 23:
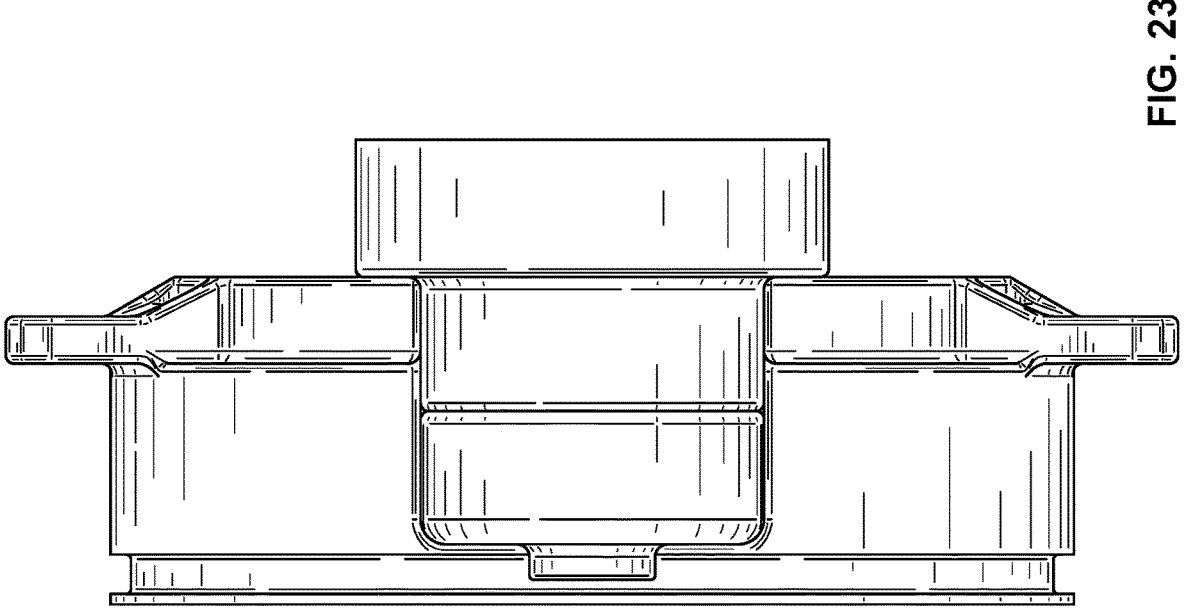
FIG. 23 is a right side view of the housing shown in FIG. 17.
Figure 24:
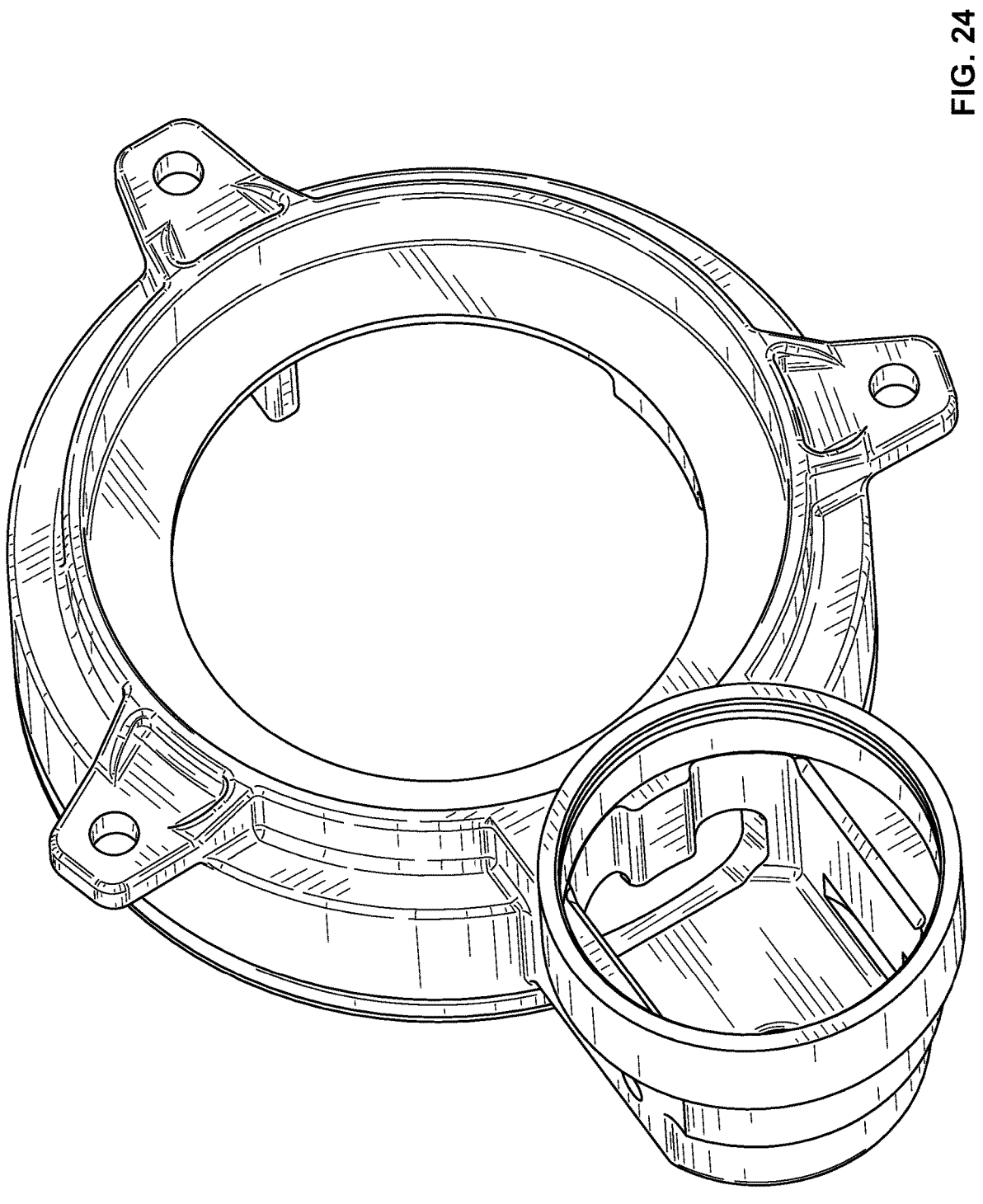
FIG. 24 is a back perspective view of the housing shown in FIG. 17.

FIG. 17 is a front perspective view of a second embodiment of an example housing for a wheel hub coupler. FIG. 18 is a front view of the housing shown in FIG. 17. FIG. 19 is a back view of the housing shown in FIG. 17. FIG. 20 is a top view of the housing shown in FIG. 17. FIG. 21 is a bottom view of the housing shown in FIG. 17. FIG. 22 is a left side view of the housing shown in FIG. 17. FIG. 23 is a right side view of the housing shown in FIG. 17. FIG. 24 is a back perspective view of the housing shown in FIG. 17.

Figure 6:
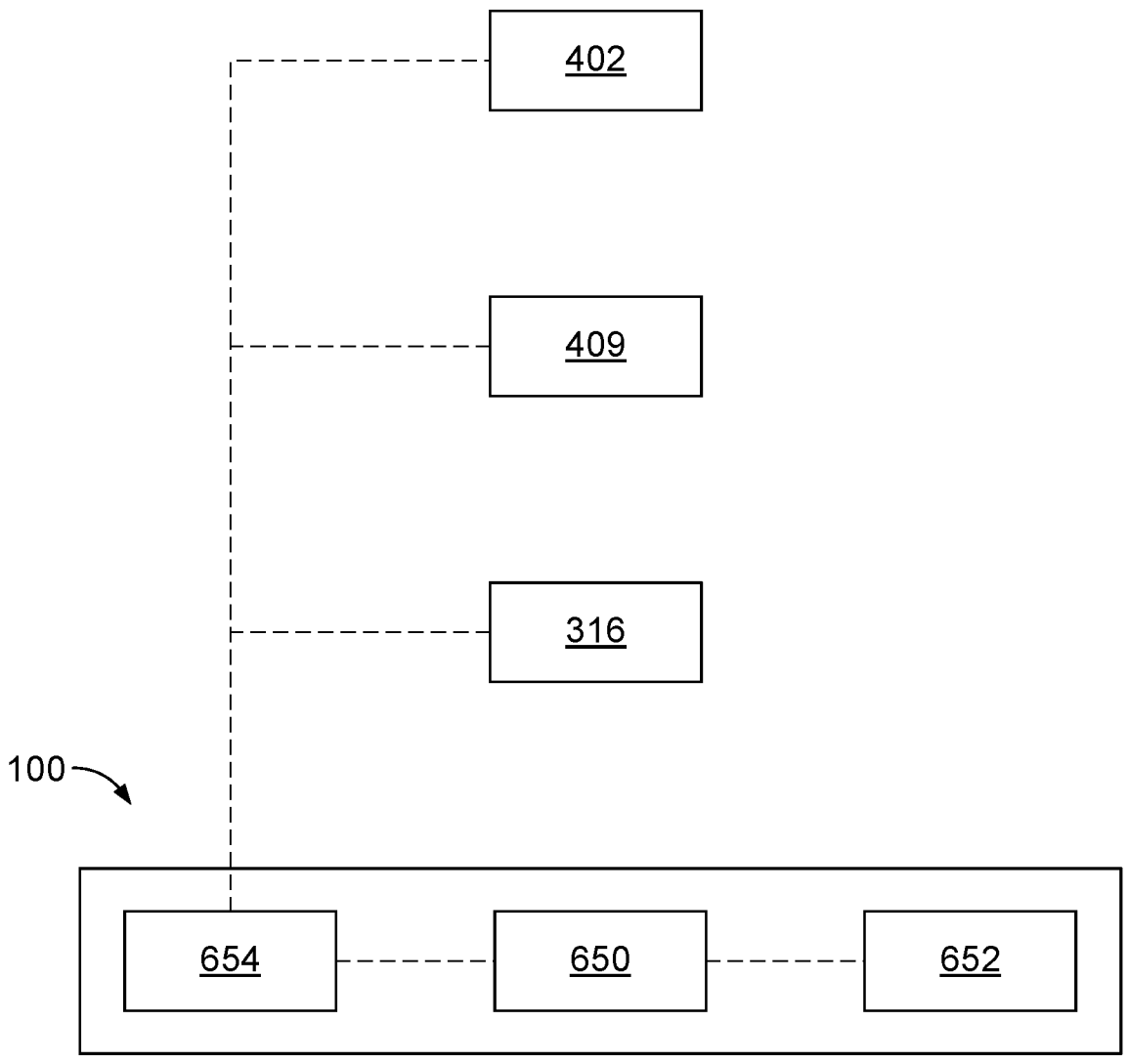
FIG. 6 is a block diagram of an example controller that can be used with aspects of this disclosure.

FIG. 6 is a block diagram of a controller 100 that can be used with aspects of this disclosure. The controller 100 can, among other things, monitor parameters of the system and send signals to actuate and/or adjust various operating parameters of the system. As shown in FIG. 6, the controller 100, in certain instances, includes a processor 650 (e.g., implemented as one processor or multiple processors) and a memory 652 (e.g., implemented as one memory or multiple memories) containing instructions that cause the processors 650 to perform operations described herein. The processors 650 are coupled to an input/output (I/O) interface 654 for sending and receiving communications with components in the system, including, for example, the electric motor. In certain instances, the controller 100 can additionally communicate status with and send actuation and/or control signals to one or more of the various system components (including an actuable system, such as the electric motor 316) of the vehicle 10, as well as other sensors (e.g., the cam position sensor 409, the spline clutch position sensor 402, pressure sensors, torque sensors, rotational speed and/or position sensors, and other types of sensors) provided with the vehicle 10. In certain instances, the controller 100 can communicate status and send actuation and control signals to one or more of the components within the vehicle 10, such as a heads-up display. The communications can be hardwired, pneumatic, hydraulic, wireless, or a combination. In some implementations, the controller 100 can be a distributed controller with different portions located throughout the vehicle 10. For example, in certain instances, the controller 100 can be a motor control unit, or it can be a separate controller apart from the motor control unit. Additional controllers can be used throughout the vehicle 10 as standalone controllers or networked controllers without departing from this disclosure.

The controller 100 can have varying levels of autonomy for controlling the actuable wheel coupling 200. For example, the controller 100 can begin sensing a vehicle parameter, such as wheel acceleration, and an operator actuates actuable wheel coupling 200, by the controller, in response. Alternatively, the controller 100 can begin sensing the vehicle parameter and actuate actuable wheel coupling 200 with no input from an operator.

In operation, the controller receives the first output from the cam position sensor and the second output from the spline position sensor. Based on the received first output, the controller 100 determines the position of the cam. Based on the received second output, the controller 100 determines a status of a wheel coupling based on the received second output. While on the face of it, these determinations should mirror each other, though that is not the case in all instances. In such situations, the controller determines a stalled actuation has occurred based on the received first output and the received second output. More specifically, the controller makes such a determination based on a disagreement in these signals. In some implementations and instances, the controller begins thermal management of the electric motor 316 responsive to the determined stall condition. Such thermal management can include reducing a duty cycle of the electric motor or ceasing motor operation for a set period of time. In some implementations, additional sensors, such as current sensors and thermal sensors, are also used to determine a state of the electric motor. In such instances, the controller is capable of adjusting the thermal management based in part on these additional inputs.

Figure 7:
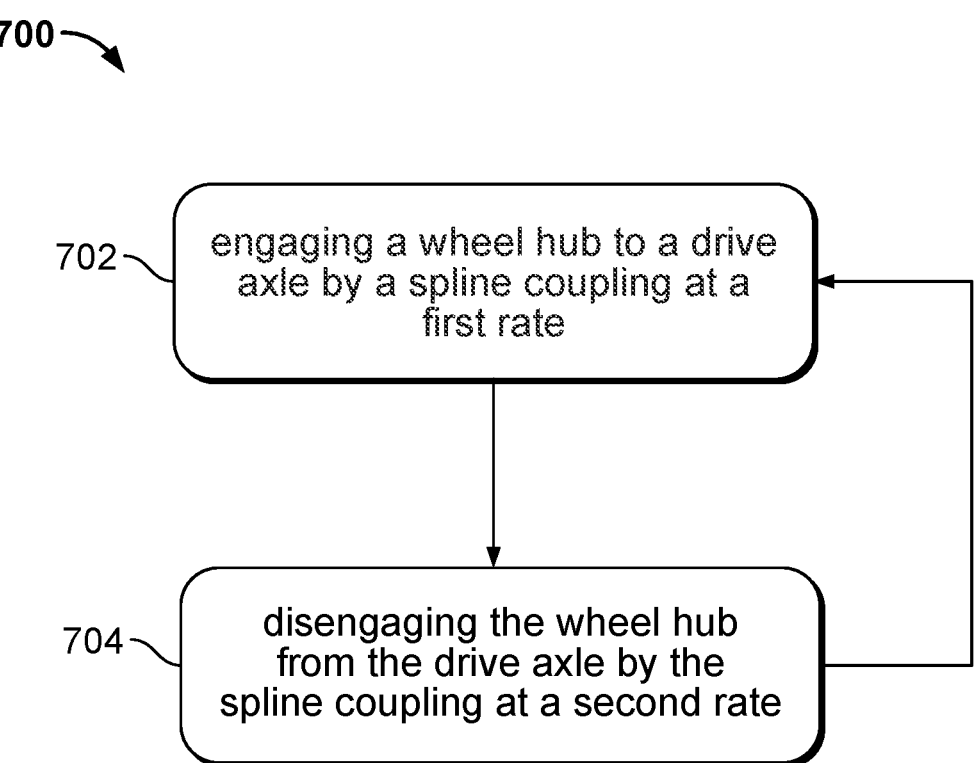
FIG. 7 is a flowchart of an example method that can be used with aspects of this disclosure.

FIG. 7 is a flowchart of an example method 700 that can be used with aspects of this disclosure. In some implementations, all or part of the method 700 is executed by the controller 100. At 702, a wheel hub 202 is engaged, or coupled, to a drive axle 30 by a spline clutch, or spline coupling 204 at a first rate. Engaging the wheel hub to the drive axle includes rotating the cam 310. An end of a linkage is translated by a bias responsive to rotating the cam. The spline coupling 204 is laterally translated responsive to translating the end of the linkage.

At 704, the wheel hub 202 is disengaged from a drive axle 30 by the spline coupling 204 at a second rate. In some implementations, the second rate is different from the first rate, such as implementations with an asymmetric cam. For example, in some implementations, the second rate is slower than the first rate. Regardless of the rate, disengaging the wheel hub from the drive axle includes rotating the cam to translating an end of a linkage. The spline coupling is laterally translated responsive to translating the end of the linkage. It should be noted that steps 702 and 704 can be performed in any order without departing from this disclosure.

In some instances, the spline coupling 204 becomes fused, locked, or otherwise stuck and is unable to move between an engaged and disengaged position. In such instances, a stalled actuation of the spline coupling 204 is determined to have occurred. In some implementations, thermal management of the electric motor 316 is begun responsive to the determined stall condition.

Figure 8A:
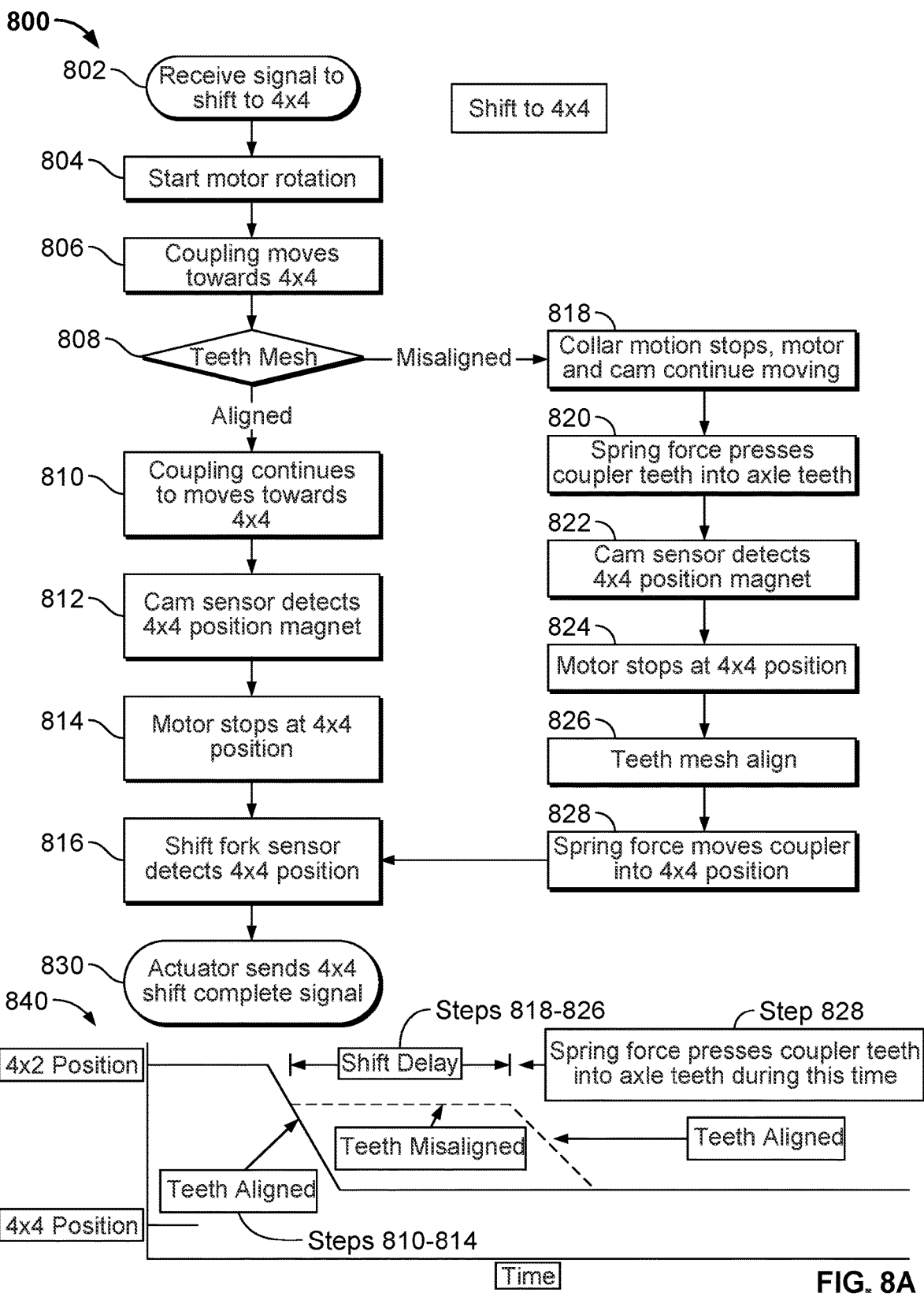
FIGS. 8A and 8B are flowcharts of example operations of the wheel hub couplers transitioning between the engaged position and disengaged position respectively.
Figure 8B:
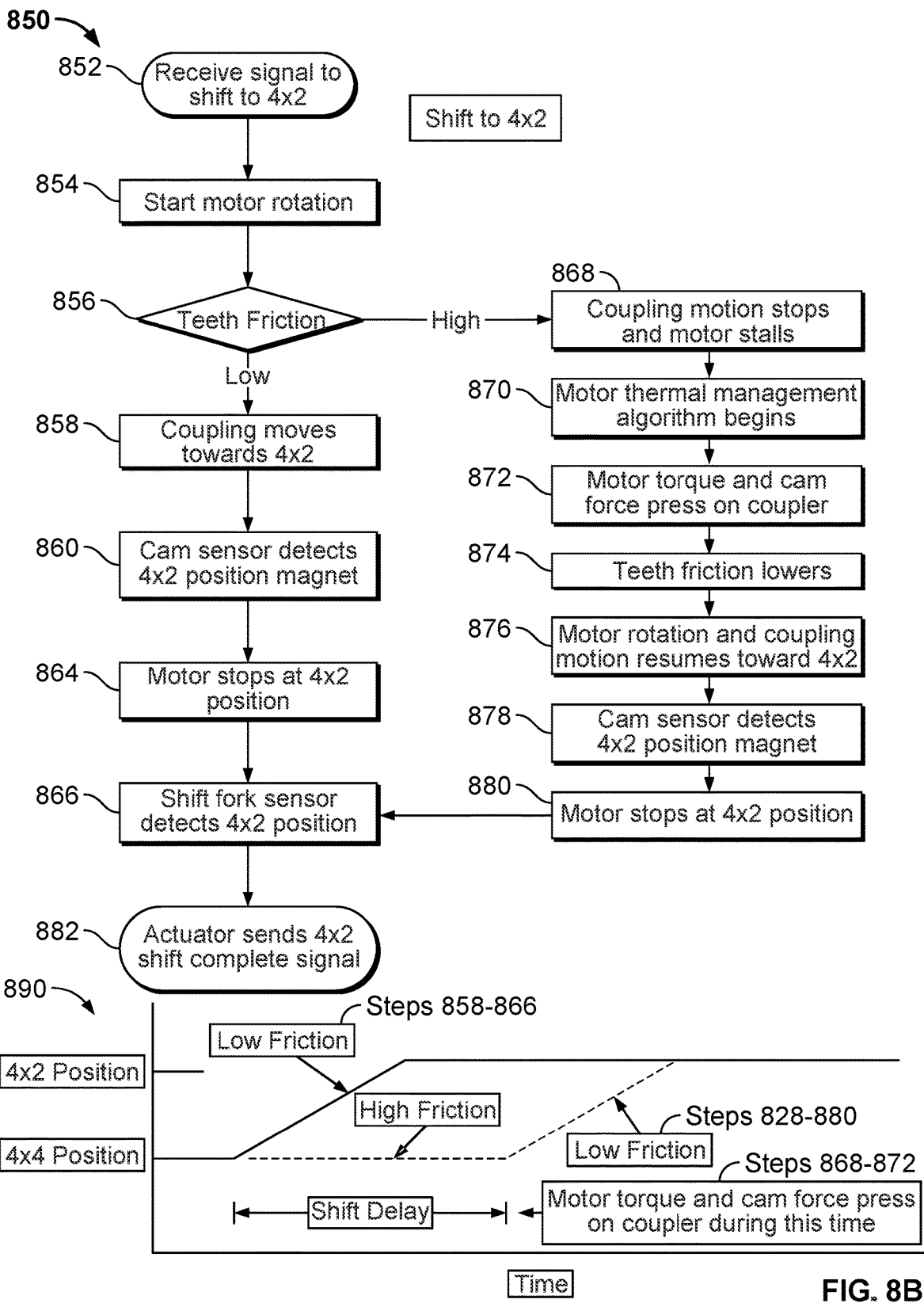

FIGS. 8A and 8B illustrate example processes that can be used by the controller 100 during such scenarios. FIG. 8A illustrates the steps taken to actuate from the disengaged position towards the engaged position. As moving towards the engaged position uses the bias 314 rather than the motor, interferences or friction tend to simply delay engagement until components are properly aligned, on the order of a few seconds or less. FIG. 8A includes a flowchart 800 and timing diagram 840 illustrating a process for shifting wheel coupling 200 from a 4×2 position into a 4×4 position. The controller receives a signal to shift into a 4×4 position (802). For example, the controller can receive the signal from a vehicle computer system. Upon receipt of the signal, the controller starts the motor (804). For instance, the controller causes a current to be applied to the motor windings causing the motor to rotate in a direction that will move the spline coupling into an engaged position. As the motor rotates, the forked linkage moves the spline coupling towards the 4×4 position (806). If the teeth on the spline coupling and the teeth on the axel align (808), the rotation of the motor continues to cause the forked linkage to pivot and move the spline coupling into engagement with the drive axel (810). Once the motor has completed the rotation of the cam, the cam position sensor detects the cam in its 4×4 position (812). The controller stops the motor upon receiving an indication that the cam position sensor has detected the 4×4 position (814). When the teeth of the spline coupling and the axel are aligned, spline coupling will reach the engaged 4×4 position at the same time (or approximately the same time) as the cam and the spline position sensor (i.e., shift fork position sensor) will detect the shift fork and spline coupling in the engaged 4×4 position (816). Upon receipt of an indication that the spline position sensor has detected the 4×4 position, the controller sends a shift complete signal to the vehicle computer system (830).

If the teeth on the spline coupling and the teeth on the axel are misaligned (808), the rotation of the motor continues but motion of the forked linkage and spline stop (818). The motor continues to rotate the cam causing the cam to rotate away from the control end of the shift fork. Spring bias on the control end of the shift fork maintains pressure on the spline coupling urging the spline coupling teeth into engagement with the axel teeth (820). Once the motor has completed the rotation of the cam, the cam position sensor detects the cam in its 4×4 position (822). The controller stops the motor upon receiving an indication that the cam position sensor has detected the 4×4 position (824). When the teeth of the spline coupling and the axel do align and mesh (826), the spring force moves the spline coupling and shift fork into the engaged 4×4 position and then the spline position sensor (i.e., shift fork position sensor) will detect the shift fork and spline coupling in the engaged 4×4 position (828). Upon receipt of an indication that the spline position sensor has detected the 4×4 position, the controller sends a shift complete signal to the vehicle computer system (830).

FIG. 8B illustrates the steps taken to actuate from the engaged position to the disengaged position. As this actuation relies primarily on the motor 316 imparting force by the cam 310, a high friction environment can require mitigation steps to be taken, such as motor thermal management algorithms to be activated. FIG. 8B includes a flowchart 850 and timing diagram 890 illustrating a process for shifting wheel coupling 200 from a 4×4 position into a 4×2 position (e.g., disengaging the spline coupling from the drive axel). The controller receives a signal to shift into a 4×2 position (852). For example, the controller can receive the signal from a vehicle computer system. Upon receipt of the signal, the controller starts the motor (854). For instance, the controller causes a current to be applied to the motor windings causing the motor to rotate in a direction that will move the spline coupling into an disengaged position. If the friction between the engaged teeth on the spline coupling and the teeth on the axel is low (856), the rotation of the motor causes the camp to engage with the control end of the forked linkage which causes the forked linkage to pivot and move the spline coupling out of engagement with the drive axel (858). Once the motor has completed the rotation of the cam, the cam position sensor detects the cam in its 4×2 position (860). The controller stops the motor upon receiving an indication that the cam position sensor has detected the 4×2 position (864). The spline position sensor (i.e., shift fork position sensor) will also detect the shift fork and spline coupling in the disengaged 4×2 position (866). Upon receipt of an indication that the spline position sensor has detected the 4×2 position, the controller sends a shift complete signal to the vehicle computer system (882).

If the friction between the engaged teeth on the spline coupling and the teeth on the axel is high (856), the rotation of the motor may stall (868). If the motor stalls the controller initiates a thermal management process to prevent the motor from burning out (870). Such thermal management can include reducing a duty cycle of the electric motor or ceasing motor operation for a set period of time. In some implementations, additional sensors, such as current sensors and thermal sensors, are also used to determine a state of the electric motor. In such instances, the controller is capable of adjusting the thermal management based in part on these additional inputs. In some examples, the controller can send a signal to the vehicle computer system to indicate that the shift processes has stalled. This can cause the vehicle computer to briefly adjust the torque applied to the drive axel with the stuck wheel coupling (872) to reduce the friction between the teeth (874). The motor rotation continues or resumes once the friction reduces continuing to disengage the spline coupling from the drive axel (876). Once the motor has completed the rotation of the cam, the cam position sensor detects the cam in its 4×2 position (878). The controller stops the motor upon receiving an indication that the cam position sensor has detected the 4×2 position (864). The spline position sensor (i.e., shift fork position sensor) will also detect the shift fork and spline coupling in the disengaged 4×2 position (880). Upon receipt of an indication that the spline position sensor has detected the 4×2 position, the controller sends a shift complete signal to the vehicle computer system (882).

While these charts are illustrated and described as engaging being driven by the bias 314 and disengaging being driven by the electric motor 316, the opposite arrangement can be used without departing from this disclosure.

While this disclosure contains many specific implementation details, these should not be construed as limitations on the scope of any inventions or of what may be claimed, but rather as descriptions of features specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described above should not be understood as requiring such separation in all implementations, and it should be understood that the described components and systems can generally be integrated together in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

The invention claimed is:

1. An actuable wheel coupling comprising:
an axially translatable spline coupling;
a forked linkage comprising a forked end and a control end, the axially translatable spline coupling being supported and carried by the forked end;
a cam configured to rotate and thereby interact with the control end of the forked linkage, the cam comprising a profile that defines an axial position of the spline coupling relative to an angular position of the cam; and
a bias biasing the control end towards the cam.

2. The actuable wheel coupling of claim 1, wherein the cam is an asymmetric cam.

3. The actuable wheel coupling of claim 1, wherein the profile is configured to axially translate the spline coupling into an engaged position at a first rate and axially translate the spline coupling into a disengaged position at a second rate that is slower than the first rate.

4. The actuable wheel coupling of claim 1, further comprising a roller attached to the control end of the forked linkage, the roller contacting the cam during normal operation, the roller coupled to the control end such that the roller translates in unison with the control end.

5. The actuable wheel coupling of claim 1, comprising a pivot between the forked end and the control end, wherein the pivot comprises:
a first triangular protrusion extending along a pivot axis of the fork, a point of the first protrusion being in-line with the pivot axis; and
a first triangular receptacle defining a profile to receive the first triangular protrusion, an angle of the first triangular receptacle being greater than an angle of the point of the first protrusion, the angle of the first triangular receptacle terminating along the pivot axis.

6. The actuable wheel coupling of claim 5, wherein the pivot further comprises:
a second triangular protrusion extending along a pivot axis of the fork linkage, a point of the second protrusion being in-line with the pivot axis, the point of the first protrusion pointing substantially in the opposite direction of the point of the first protrusion; and
a second triangular receptacle defining a profile to receive the second triangular protrusion, an angle of the second triangular receptacle being greater than an angle of the point of the second protrusion, the angle of the second triangular receptacle terminating along the pivot axis.

7. The actuable wheel coupling of claim 1, wherein the forked end comprises:
spline clutch retainers configured to retain the spline coupling, the spline clutch retainers configured to allow rotational movement along a first rotational axis parallel to a pivot axis of the linkage, the spline clutch retainers configured to allow rotational movement along a second rotational axis along a circular center of the spline coupling.

8. The actuable wheel coupling of claim 7, wherein the spline clutch retainers comprise:
a trunnion mount configured to be received by the forked end; and
a profile, opposite of the trunnion, configured to receive and at least partially retain the spline coupling.

9. The actuable wheel coupling of claim 1, further comprising:
an electric motor;
a worm gear rotably coupled to a shaft of the electric motor; and
a pinion gear directly coupled to the cam, the pinion gear being engaged with the worm gear such that rotation of the worm gear imparts rotation on the pinion gear and cam.

10. The actuable wheel coupling of claim 1, further comprising a cam position sensor comprising:
a first magnet at a first side of the cam;
a second magnet at a second side of the cam opposite a cam shaft from the first magnet, the second magnet having an opposite polarity from the first magnet; and
a Hall Effect sensor adjacent to the cam, the Hall Effect sensor configured to detect the polarity of the first magnet or the second magnet, the Hall Effect sensor configured to produce an output indicative of the cam position.

11. The actuable wheel coupling of claim 1, further comprising a spline position sensor comprising:
a magnet at the control end; and
a Hall Effect sensor configured to determine a position of the control end relative to the sensor, the Hall Effect sensor configured to produce an output indicative of an engagement position of the spline coupling.

12. The actuable wheel coupling of claim 1, further comprising:

an electric motor arranged to rotate the cam;

a cam position sensor configured to produce a first output indicative of the cam position;

a spline position sensor configured to produce a second output indicative of an engagement position of the spline coupling; and a controller configured to:

receive the first output from the cam position sensor;

receive the second output from the spline position sensor;

determine the position of the cam based on the received first output; and determine a status of a wheel coupling based on the received second output.

13. The actuable wheel coupling of claim 12, wherein the controller is further configured to:

determine a stalled actuation based on the received first output and the received second output; and in response to determining the stalled actuation, begin thermal management of the electric motor.

14. A method comprising:

engaging a wheel hub to a drive axle by a spline coupling at a first rate, wherein engaging the wheel hub to the drive axle comprises:

rotating a cam, translating an end of a linkage, by a bias, responsive to rotating the cam, and laterally translating the spline coupling responsive to translating the end of the linkage; and disengaging the wheel hub from the drive axle by the spline coupling at a second rate, wherein disengaging the wheel hub from the drive axle comprises:

rotating a cam, translating an end of a linkage by rotating the cam, and laterally translating the spline coupling responsive to translating the end of the linkage, wherein the second rate is slower than the first rate.

15. The method of claim 14, further comprising:

determining a stalled actuation of the spline coupling; and in response to determining the stalled actuation, beginning thermal management of an electric motor.

16. A vehicle comprising:

a wheel hub;

a drive axle;

an actuable wheel coupling configured to actuably couple the wheel hub and the drive axle to rotate in unison with one another, the actuable wheel coupling comprising:

an axially translatable spline coupling configured to be translated between an engaged position and a disengaged position, the engaged position coupling the wheel hub and drive axle, the disengaged position decoupling the wheel hub and drive axle;

a forked linkage comprising a forked end and a control end, the axially translatable spline coupling being supported and carried by the forked end;

a cam configured to rotate and thereby interact with the control end of the forked linkage, the cam comprising a profile that defines an axial position of the spline coupling relative to an angular position of the cam; and a bias biasing the control end towards the cam.

17. The vehicle of claim 16, further comprising a roller attached to the control end of the forked linkage, the roller contacting the cam during normal operation, the roller coupled to the control end such that the roller translates in unison with the control end.

18. The vehicle of claim 16, further comprising:

an electric motor;

a worm gear rotably coupled to a shaft of the electric motor; and a pinion gear directly coupled to the cam, the pinion gear being engaged with the worm gear such that rotation of the worm gear imparts rotation on the pinion gear and cam.

19. The vehicle of claim 16, further comprising a cam position sensor comprising:

a first magnet at a first side of the cam;

a second magnet at a second side of the cam opposite a cam shaft from the first magnet, the second magnet having an opposite polarity from the first magnet; and a Hall Effect sensor adjacent to the cam, the Hall Effect sensor configured to detect the polarity of the first magnet or the second magnet, the Hall Effect sensor configured to produce a cam position stream indicative of the cam position.

20. The vehicle of claim 16, further comprising a spline position sensor comprising:

a magnet at the control end; and a Hall Effect sensor configured to determine a position of the control end relative to the sensor, the Hall Effect sensor configured to produce an engagement position stream indicative of an engagement position of the spline coupling.

\* \* \* \* \*